United States Patent [19]
Mowry et al.

[11] Patent Number: 5,696,958
[45] Date of Patent: Dec. 9, 1997

[54] METHOD AND APPARATUS FOR REDUCING DELAYS FOLLOWING THE EXECUTION OF A BRANCH INSTRUCTION IN AN INSTRUCTION PIPELINE

[75] Inventors: Todd C. Mowry, Palo Alto; Earl A. Killian, Los Altos, both of Calif.

[73] Assignee: Silicon Graphics, Inc., Mt. View, Calif.

[21] Appl. No.: 405,622

[22] Filed: Mar. 15, 1995

Related U.S. Application Data

[63] Continuation of Ser. No. 3,072, Jan. 11, 1993, abandoned.

[51] Int. Cl.$^6$ ............................................. G06F 9/00
[52] U.S. Cl. ............................................. 395/582; 395/800
[58] Field of Search ............................................. 395/375, 800, 395/582, 584, 586

[56] References Cited

U.S. PATENT DOCUMENTS

| | | | |
|---|---|---|---|
| 4,439,827 | 3/1984 | Wilkes | 395/375 |
| 4,594,659 | 6/1986 | Guenthner et al. | 395/375 |
| 4,991,080 | 2/1991 | Emma et al. | 395/375 |
| 5,136,697 | 8/1992 | Johnson | 395/375 |
| 5,283,873 | 2/1994 | Steely, Jr. et al. | 395/375 |
| 5,287,467 | 2/1994 | Blaner et al. | 395/375 |
| 5,485,587 | 1/1996 | Matsuo et al. | 395/375 |
| 5,522,053 | 5/1996 | Yoshida et al. | 395/375 |

OTHER PUBLICATIONS

Katevenis, et al., "Reducing the Branch Penalty by Rearranging Instructions in a Double–Width Memory," *Computer Science Institute*, pp. 15–27.

Lee, et al., "Branch Prediction Strategies and Branch Target Buffer Design," *Computer*, vol. 17, No. 1, pp. 6–22, Jan., 1984.

*Primary Examiner*—William M. Treat
*Assistant Examiner*—Zarni Maung
*Attorney, Agent, or Firm*—Townsend and Townsend and Crew LLP

[57] ABSTRACT

A pipeline processor, when processing a branch instruction, initiates fetching of both the target and fall-through streams prior to execution of the branch instruction such that the number of pipeline cycles between completion of execution of the branch instruction and initiation of processing of the head instruction of the target or fall-through stream is less than the minimum number of pipeline cycles between fetching of an instruction and the execution of the instruction. At least one otherwise wasted pipeline cycle is saved by early instruction fetching and storing in a prefetch register. In some cases, two or more otherwise wasted cycles can be saved.

20 Claims, 11 Drawing Sheets

METHOD AND APPARATUS FOR
REDUCING DELAYS FOLLOWING THE
EXECUTION OF A BRANCH INSTRUCTION
IN AN INSTRUCTION PIPELINE

This is a Continuation of application Ser. No. 08/003,072, filed Jan. 11, 1993, now abandoned.

The present invention relates to a method and apparatus for processing instructions in a pipeline processor and in particular for reducing or eliminating delays following execution of a branch instruction in a pipeline processor.

BACKGROUND OF THE INVENTION

One technique which has been employed for increasing speed in a data processor is the use of pipeline processing. FIG. 1 shows an example of a processing environment within which pipeline processing can be employed. In FIG. 1, a CPU 10 is connected to a memory management unit (MMU) 12 providing for processor I/O 14 and which communicates with a floating point unit 16 (FPU) and a translation lookaside buffer (TLB) 18 which also communicates directly with the CPU 10. The MMU 12 and the FPU 16 are connected by an instruction bus 20 and a data bus 22. Instruction bus 20 communicates with an instruction cache 24 and the data bus 22 communicates with a data cache 26. The memory management unit 12 communicates with a tag cache 28. The operation of all of these items is well-known in the art. The CPU includes a pipeline processing unit (PPU) 30. As shown in FIG. 1, the PPU 30 includes a number of pipeline stages. The number of stages in a pipeline processing unit and the operation of each stage will vary among different implementations. FIG. 1 shows one possible configuration of a pipeline processing unit. In this configuration, the stages include a first instruction fetch stage (IF), a second instruction fetch stage (IS), a register fetch stage (RF), an execution stage (EX), a first data access stage (DF), a second data access stage (DS), a tag check stage (TC), and a write back stage (WB). A program counter 31 holds an indication of the address of an instruction for processing in the pipeline. An instruction register 32 stores an instruction for processing in the pipeline. In certain pipeline configurations, there may be more than one instruction register and/or more than one program counter such as instruction registers and program counters associated with various pipeline stages. For example, there may be a first instruction fetch stage program counter ($PC_{IF}$), a second instruction fetch stage program counter ($PC_{IS}$) and so forth. Similarly, there can be a register fetch stage instruction register ($IR_{RF}$), an execution stage instruction register ($IR_{EX}$) and so forth. The number and configuration of instruction registers and program counters will depend on the particular pipeline configuration, as is known in the art.

FIG. 2 depicts, schematically, the location of instructions in various stages of the pipeline during a number of pipeline cycles. Only the first five stages of the pipeline are depicted in FIG. 2. In the example depicted, in pipeline cycle (N−1), the instruction register $IR_{RF}$ 32 will hold the instruction which is in the RF stage and which will be processed by the EX stage during pipeline cycle N. In the example depicted, during linear (non-branching) instruction flow, the instruction which is to be processed by stage IF during pipeline cycle N will be at an address two instruction words after the address held by instruction register $IR_{RF}$ 32. In FIG. 2, this instruction is denoted by L1. At the end of pipeline cycle N, instruction L1 is transferred from stage IF to stage IS. During the next pipeline cycle N+1, instruction L1 is processed by stage IS and the next instruction word (L2) (i.e., the instruction word immediately following L1) is processed by stage IF. This process continues with instructions being processed by a succeeding stage of the pipeline processing unit in successive pipeline cycles and with a plurality of successive instructions being processed by different pipeline stages in a given pipeline cycle. As seen in FIG. 2, during linear processing instruction L1 is executed in the EX stage during pipeline cycle N+3. The next instruction L2 is executed in the EX stage during pipeline cycle N+4, the next instruction is executed in the EX stage during pipeline cycle N+5, and so on.

A difficulty arises in pipeline processing when one of the instructions in the pipeline is a branch instruction. A branch instruction is an instruction which affects the order in which instructions are to be executed. An example would be an instruction to determine the sign of the number in a specified register and to execute a first group of instructions if that sign is positive and execute a second group of instructions otherwise. FIG. 3 depicts the flow of instructions when there is a branch. In the example depicted in FIG. 3, a linear flow of instructions L1 (40), L2 (42), I2 (44), I0 (46) precedes a branch. The instruction labels in FIG. 3 are selected to correspond to those in FIGS. 2, 5 and 6. The branch instruction I1 48 returns a result indicating whether a first or second instruction stream is to be executed. In general, each of the groups of instructions that may be selected by the branch instruction 48 can be termed a "target" of the branch instruction I1. Often, however, only the "taken" instruction stream is referred to as the target. The first instruction in each stream is called the head instruction of that target stream. In the example shown in FIG. 3, one of the groups of instructions that can be selected by instruction I1 are the instructions immediately following instruction I1 in the address space, namely instructions I3 (50), I4 (52), I5 (54), and so on. When instructions in a target immediately follow the branch instruction in the address space, these instructions are referred to as "fall-through" instructions or the "not taken" stream. The other stream 62 is referred to as the "taken" stream, or "target" stream.

FIG. 4 depicts the order in which the instructions are arranged in the virtual address space, illustrating that fall-through instructions 50, 52, 54 immediately follow the branch instruction 48 in this example. As depicted in FIG. 4, the instructions 56, 58, 60 in the taken branch 62 may be in the address space some distance away from the branch instruction 48. As explained below, the instructions depicted in FIG. 4 may not all reside in the instruction cache 24 at any given time which may require that the cache 24 be reloaded or updated in a manner well-known in the art. Also, pipeline processing can be conducted in the context of processors which do not include a cache and in which the instructions, for example, reside in main memory.

In certain types of pipeline processing units, the order of execution of instructions is rearranged, and in particular, where possible, an instruction which does not follow the branch instruction 48 in the address space is executed after the branch instruction 48 and before execution of one of the targets 62, 49. This is done because a branch instruction normally entails a certain delay. For example, one of the linear instructions such as I2 44 can potentially be executed after instruction I1 (when not prohibited by dependencies) so that the pipeline processing unit will not be idle in the delay period between execution of the branch instruction and execution of a fall-through or target stream instruction. This otherwise idle time period after the branch instruction is referred to as a "delay slot" time period and an instruction which is moved into this instruction, such as instruction I2, is referred to as the "delay slot instruction."

As noted above, in many previous devices the instructions which were processed by the IF stage of the pipeline processor, were always the instructions immediately following the instruction which had been processed by the IF stage in the previous pipeline cycle. FIG. 5 depicts a situation in which the branch instruction I1 (executed in the EX stage at pipeline cycle N+3) selects the fall-through stream 49. As described above, instruction I2, the delay slot instruction, has been placed in the pipeline immediately following the branch instruction I1 and instruction I2 is executed in the EX stage at pipeline cycle N+4, which is the cycle after the branch instruction is executed. In the next pipeline cycle, N+5, instruction I3 is moved into the execution unit EX. This is the result desired since the branch instruction I1 selected the fall-through branch 49 whose head instruction is instruction I3 (50). Thus, the procedure of always loading the next instruction from the address space into the first stage of the pipeline works well in the case of a branch instruction I1 which selects the fall-through branch 49.

However, there is a difficulty when the branch instruction 48 selects a target stream 62 which is not the fall-through stream. This difficulty arises because, for at least some types of branch instructions, it is not definitively determined which branch will be selected by the branch instruction 48 until the branch instruction is executed by the execution stage EX of the pipeline processing unit. This situation is illustrated in FIG. 6. As shown in FIG. 6, at cycle N+1, instruction I2 (44) is loaded in stage IF (since instruction I2 has been selected as the delay slot instruction). At pipeline cycle N+2, instruction I3 (50) is processed by pipeline stage IF. At pipeline cycle N+3, instruction I4 (52) is processed by stage IF, instruction I3 is processed by stage IS, instruction I2 is processed by stage RF and the branch instruction I1 is processed by the execution stage EX. As a result of execution of instruction I1, the target of the branch instruction is indicated as the taken stream 62. There is no difficulty in the next pipeline cycle N+4 since this is occupied by the delay slot instruction I2 which is in the proper place in the pipeline. However, in the following pipeline cycle N+5, when it is desired to execute the head instruction T1 (56) of the taken stream 62, there is a difficulty because the instruction that would be in the pipeline in a position to be transferred to the execution stage EX is instruction I3 (50), rather than instruction T1 (56). Accordingly, in typical previous devices, following cycle N+3, after execution of a branch instruction I1 which specifies a taken stream, the instructions I3 and I4 are annulled 43, 45, i.e., they are not further processed by the pipeline (or at least the pipeline is configured so that these instructions will not be executed). Because it is known at the end of pipeline cycle N+3 that it will be desired to execute instruction T1, during pipeline cycle N+4, the address of instruction T1 (56) is provided to the pipeline 47 for processing by the first pipeline stage IF. As can be seen in FIG. 6, however, there will be a delay of at least three pipeline cycles (namely cycles N+4, N+5 and N+6) before instruction T1 reaches the execution stage EX in cycle N+7. This corresponds to the number of pipeline stages by which an instruction is processed in the pipeline before it reaches the execution stage. As noted above, the number and order of stages in the pipeline will depend upon the implementation of the pipeline processing unit. In the example shown in FIG. 6, there are three stages (IF, IS and RF) before the execution stage EX and thus there is a delay of at least three pipeline cycles N+4, N+5 and N+6 before instruction T1 reaches the execution stage EX.

This delay between execution of the branch instruction I1 and execution of the target instruction T1 reduces throughput of instructions and, since at least some pipeline stages are idle, reduces efficiency of the pipeline processing unit.

A number of approaches can be used in an attempt to reduce the undesirable effects of delays caused by branches in pipeline processing. One approach would be to load the taken stream head instruction T1 (56), rather than the fall-through stream head instruction I3 (50), after the delay slot instruction I2. When this approach is taken, however, as depicted in FIG. 7, an analogous delay problem occurs when execution of the branch instruction 48 results in a "not taken" or fall-through stream 49. Thus, as seen in FIG. 7, there is still a potential for a delay of three cycles after execution of the branch instruction I1 before the head instruction I3 (50) of the fall-through stream 49 reaches the execution stage EX.

Some amount of improvement can be obtained by determining whether a fall-through stream 49 or a taken stream 62 is statistically more likely, and selecting either the scheme of FIG. 6 or FIG. 7 for handling all branch instructions. A more sophisticated version of this approach involves branch prediction. In branch prediction, an attempt is made to determine, for a given branch instruction, whether that branch is more likely to result in execution of the fall-through stream 49 or the taken stream 62. This prediction can be based on the characteristics of the program being executed, statistical analysis of previous branch results and the like. However, in either of these cases, since it is not known, but only statistically predicted, which way the branch will go, there will be a certain number of branches where the prediction is incorrect and delays will occur.

Another approach is to attempt to insert instructions after the branch instruction, i.e., to add additional delay slot instructions after the branch instruction I1. However, this approach is rarely completely successful since there are severe constraints on which instructions can be moved in this fashion. An instruction I2 can be moved into the delay slot only if it does not affect and is not affected by the execution of instructions between its initially assigned position and the new position.

Accordingly, it would be useful to provide for pipeline processing of branch instructions which could reduce or eliminate delays associated with such branch instructions.

SUMMARY OF THE INVENTION

According to the present invention, the pipeline processes instructions from both streams of a branch instruction, before execution of the branch instruction by the EX stage is complete. In this way, the delay following execution of a branch instruction by the EX stage is reduced to a number of cycles which is less than the number of cycles it normally takes an instruction to proceed from a first, instruction fetch stage to the execution stage.

According to one embodiment of the invention, the first stage of the pipeline processor begins processing the head instruction of a non-fall-through stream in the same pipeline cycle when the branch instruction is being executed. In this embodiment, it is possible to recognize that an instruction is a branch instruction in a pipeline stage prior to the execution stage. This early processing of a non-fall-through target does not cause delays in the case of a not-taken branch because, preferably, more than one instruction can be processed by at least some of the pipeline stages during a given pipeline cycle. In this way it is possible for the pipeline processing unit to "get ahead" in the instruction stream (i.e., to have more instructions being processed by the pipeline processing unit in a given cycle than could be executed within a number of cycles which is equal to the number of stages prior to the execution stage). In this embodiment, the number of pipeline cycles between execution of a branch instruction and execution of the head instruction of the target is one less than the number of pipeline stages between initiation of fetching the instructions and the execution stage.

According to another embodiment of the invention, the head instruction of the non-fall-through stream is processed by the first stage of the pipeline during the pipeline cycle which precedes the cycle in which the branch instruction is executed. In this embodiment, the number of pipeline cycles between execution of a branch and execution of the head instruction of a target of the branch is two less than the number of pipeline stages between the first stage where instruction fetch processing begins and the execution stage.

In one embodiment of the invention, it is always possible to begin processing the head instruction of the non-fall-through stream no later than simultaneously with execution of the branch instruction (thus reducing the number of idle cycles by one) and it is sometimes possible to begin pipeline processing the head instruction of the non-fall-through stream prior to execution of the branch instruction (thus reducing the number of idle cycles after a branch instruction by at least two).

According to one embodiment of the invention, branch instructions are pipeline processed using apparatus which includes at least one register for holding one or more prefetched instructions and a device for generating a target address prior to execution of a branch instruction. The device for generating a target address, in one embodiment, includes an adder which can be a short-width adder, since only sufficient address bits must be generated to identify an entry in the instruction cache.

According to one embodiment of the invention, hardware used in connection with pipeline processing a branch instruction includes at least two prefetch instruction registers and at least two address registers.

According to another embodiment of the invention, an instruction cache is configured to permit simultaneous fetching of two independent instructions. In this way, the fall-through head instruction 50 and the target head instruction 56 are fetched in parallel, i.e., so as to both reside in the pipeline. Execution of the branch instruction permits one of the two parallel-fetched instructions to proceed through the pipeline, for example, by having the branch outcome control a multiplexer.

DESCRIPTION OF THE PREFERRED EMBODIMENTS

Figure 1:
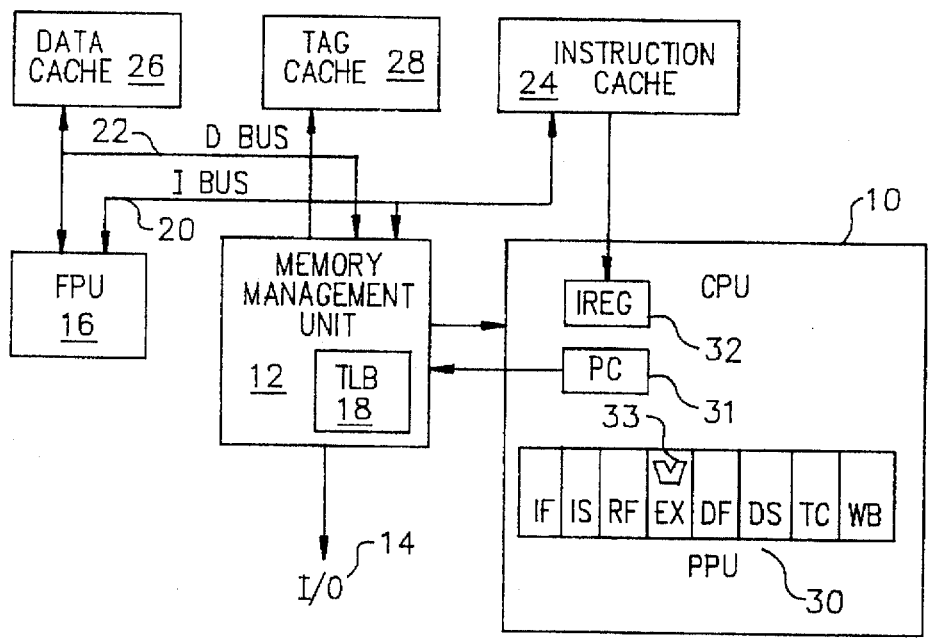
FIG. 1 is a block diagram of a data processor which includes a pipeline processing unit.
Figure 3:
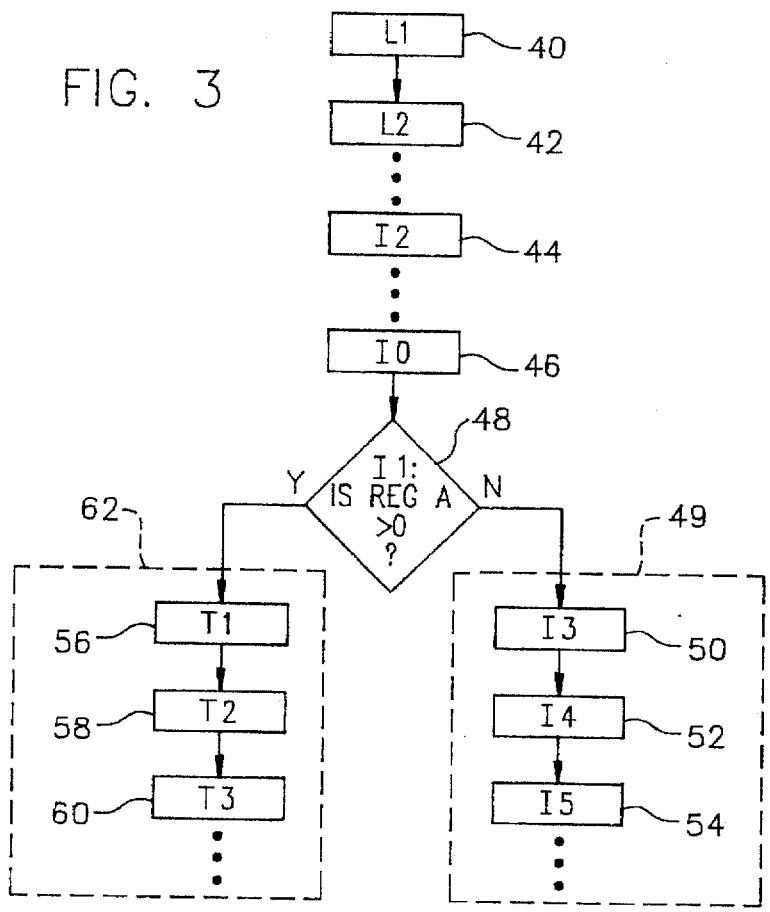
FIG. 3 is a flow diagram showing instruction flow for a program having a branch instruction.
Figure 2:
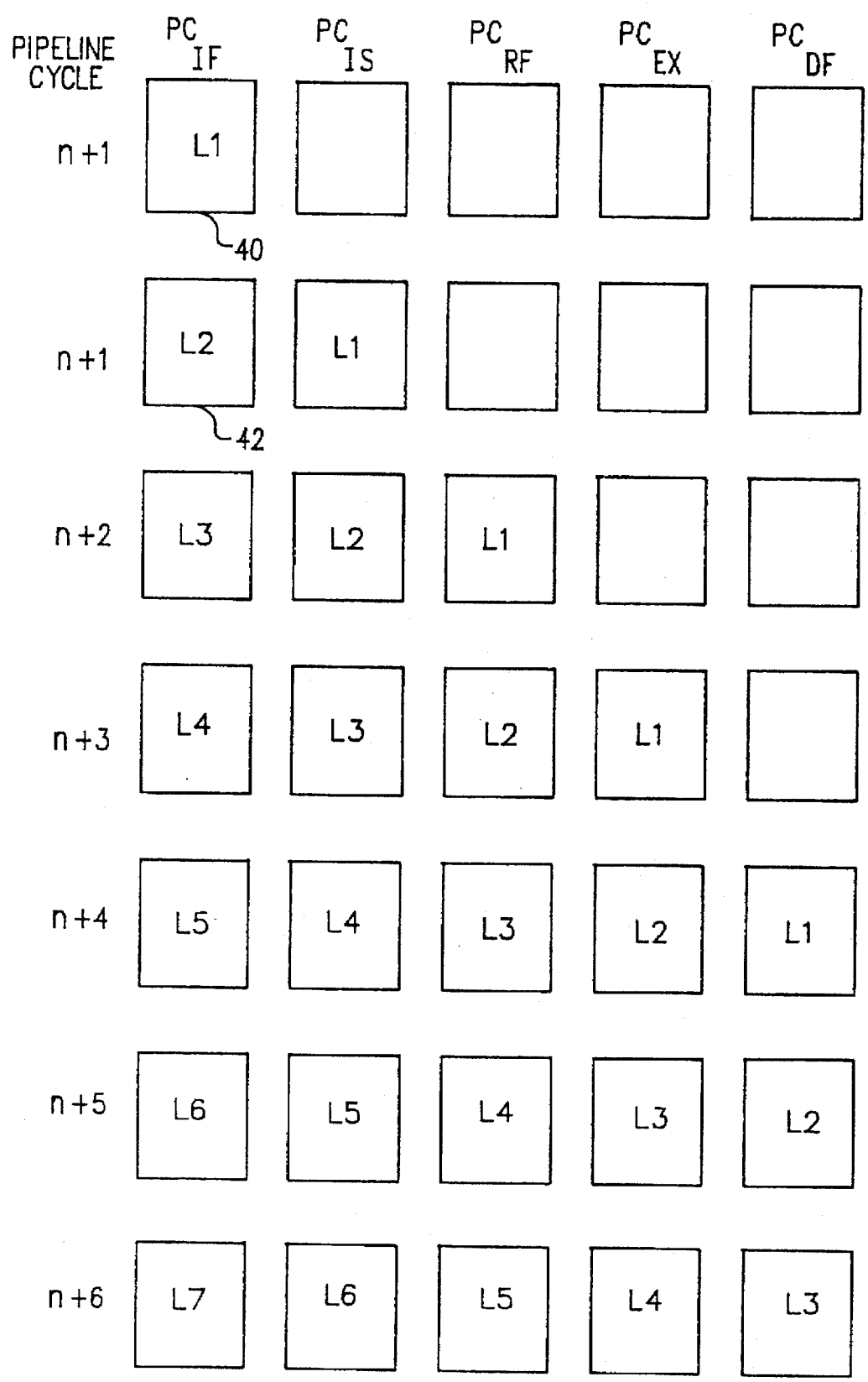
FIG. 2 depicts the contents in the initial stages of pipeline processor through a plurality of pipeline cycles.
Figure 4:
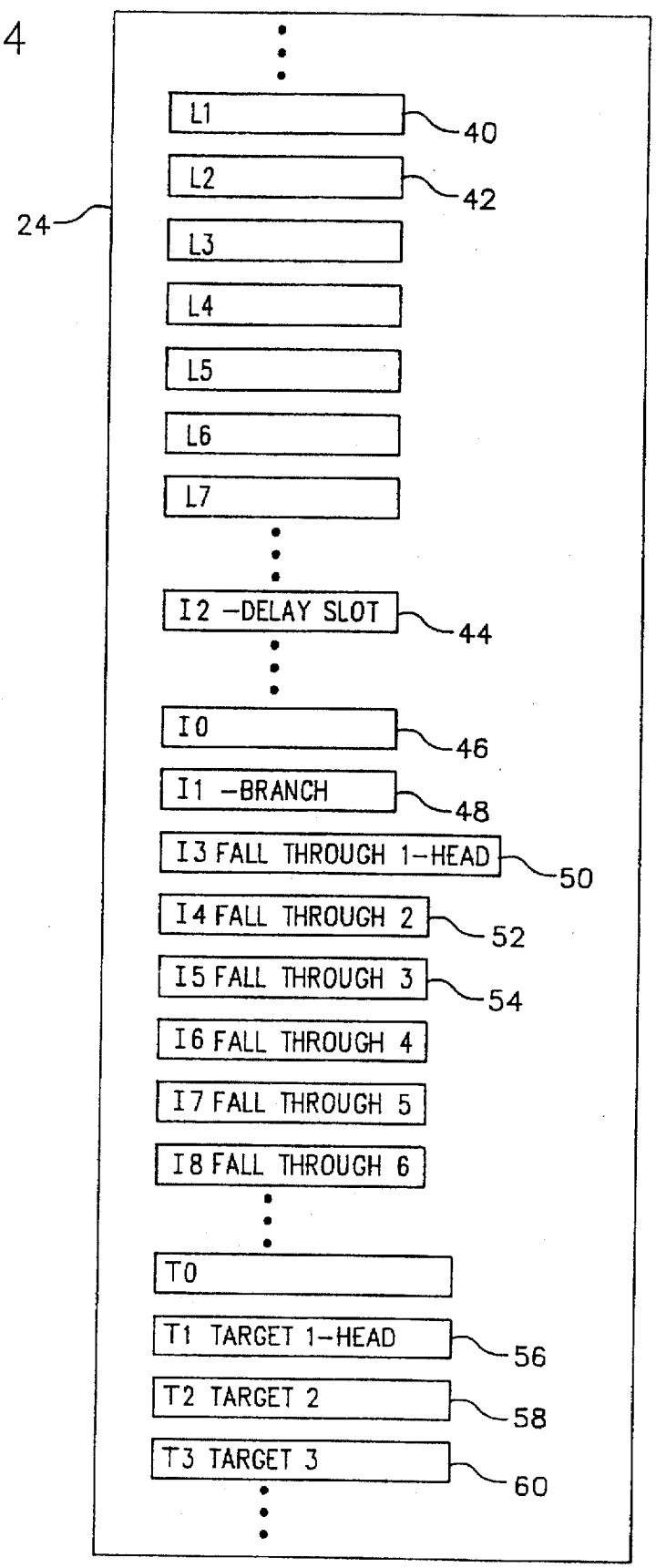
FIG. 4 shows an example of the order in which instructions are stored in an instruction cache.
Figure 5:
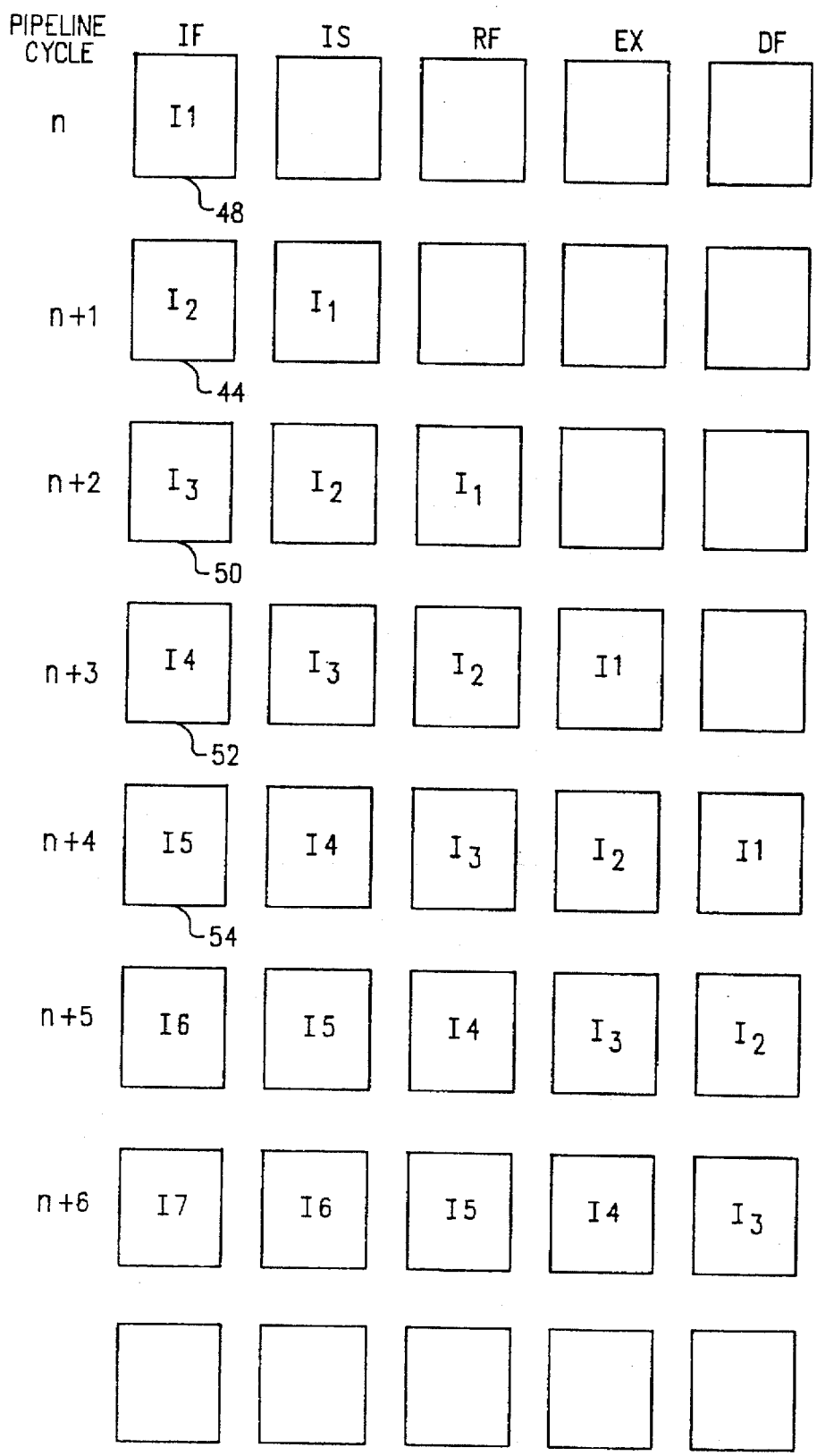
FIG. 5 is a schematic diagram similar to FIG. 2 but showing processing of instructions which include a branch instruction.

One embodiment of the present invention takes advantage of two aspects of the processor depicted in FIG. 1. The first aspect is that although execution of the target instruction cannot be done until after execution of the branch instruction (since it will not be known, prior to execution of the branch instruction, which target will be executed), the fetching of the target instructions is not restricted in this way. In this embodiment of the invention, the target address is available to initiate instruction fetching when the branch instruction is processed by an earlier (pre-execution) pipeline stage. In the apparatus depicted in FIG. 1, the target address is available after the branch instruction reaches the RF pipeline stage.

The second aspect is the ability to fetch two instructions during a pipeline cycle, rather than one instruction. Certain data processors fetch two instruction words at a time. An example is model R4000 microprocessor available from MIPS Computer Inc. In this device, the instructions are 32 bits wide but the instruction cache word (i.e., the instruction word which is fetched from the instruction cache in each fetch cycle) is 64 bits wide. This architecture is provided in the R4000 so that the instruction cache is symmetrical to the data cache. However, it is believed this ability to fetch two instructions in a single pipeline cycle has not been used to reduce branch instruction delay, in the manner described below.

When an instruction pair is fetched in this embodiment, the first instruction in the pair is always an instruction having an even address and the second instruction is an instruction having an odd address.

By buffering successive instruction pairs as they are fetched, it is possible to "get ahead" in the instruction stream, since instructions can be fetched twice as fast as they are consumed or executed. In this embodiment, at least one prefetched fall-through instruction is stored in a buffer (known as a prefetch register) and is available for execution after the branch instruction, if needed. This condition can always be satisfied, even in the worst case. The worst case occurs when the branch instruction I1 is the head instruction of a taken stream selected by an earlier branch. This is the worst case since the prefetcher will not have gotten ahead in the instruction stream at the time the branch instruction I1 enters the pipeline. The worst case also includes branching to an odd address target rather than an even address target, since the instruction following the target will fall in a separate double-word. Table I lists, for a number of successive pipeline cycles, contents of the IF stage, the IS stage, the IREG register 32 the prefetch register (PF1) the RF, EX and DF stages. Note that in this example I0 is the branch instruction, I1 is the delay slot instruction, I2 is the fall-through stream head instruction and T1 is the non-fall-through stream head instruction. Since instructions are fetched in pairs, the contents of the IF and IS stages and the IREG and PF1 registers indicate pairs of instructions. The active instruction of the pair (i.e., the instruction out of the pair which is processed by the corresponding pipeline stage during the indicated pipeline cycle) is indicated by underlining.

Once buffering is introduced, the instruction fetch pipe stages (IF and IS) are effectively temporally disconnected from the rest of the pipeline, since an instruction can now be fetched arbitrarily far in advance of being executed.

An instruction pair remains in IREG as long as either of its instructions is currently in its RF pipeline stage. The critical pipeline stage in Table I, as well as in Tables II–IV, discussed below, is the RF stage of the third instruction after the branch. At this point, depending on whether or not the branch was taken, either the taken stream head instruction (T1) or the fall-through stream head instruction (I4 for odd branch alignment, I3 for even alignment) must be in IREG. Those instances are indicated in the Tables by a single asterisk. Notice that for both of the taken stream cases, the target instruction arrives at IREG straight out of the instruction cache from stage (IS). For the untaken stream cases, the fall-through head instruction has already been fetched and stored in the prefetch buffer (PF1). In the case of odd branch alignment, the fall-through head instruction (I4) arrives in IREG directly from PF1. For the even branch alignment case, the fall-through head instruction (I3) is already in IREG since the previous instruction (I2) falls within the same double-word.

The branch outcome is used to make the following decisions: (1) determining whether the first fall-through instruction (I4 for odd alignment, I3 for even alignment) is to be annulled or executed at the start of its RF stage; (2) selecting whether the taken stream head instruction (T1) or the second fall-through stream instruction (I4 for odd alignment, I3 for even alignment) should proceed into its RF stage; and (3) selecting whether the instruction following the target stream head (T2) or the third fall-through stream instruction (I5 for odd alignment, I4 for even alignment) should be fetched.

Tables III and IV illustrate instruction fetching for taken and untaken branches where the branch instruction falls in the odd half of a double-word.

TABLE I

Worse Case Taken Branches with Even Branch Alignment
(Single-Cycle Design)

| Cycle | IF | IS | PF1 | IREG | Description of Inst in RF Stage | RF | EX | DF |
|---|---|---|---|---|---|---|---|---|
| n | I0–I1 | — | — | — | — | — | — | — |
| n + 1 | I2–I3 | I0–I1 | — | — | — | — | — | — |
| n + 2 | I4–I5 | I2–I3 | — | I0–I1 | Branch to T1 | I0 | — | — |
| n + 3 | T0–T1 | I4–I5 | I2–I3 | I0–<u>I1</u> | Delay Slot | I1 | I0 | — |
| n + 4 | T2–T3 | T0–T1 | I4–I5 | <u>I2</u>–I3 | (Annulled) | X (Annulled) | I1 | I0 |
| n + 5 | T4–T5 | T2–T3 | — | T0–<u>T1</u>* | Taken Stream | T1 | X (Annulled) | I1 |
| n + 6 | T6–T7 | T4–T5 | — | <u>T2</u>–T3 | Taken Stream | T2 | T1 | X (Annulled) |

TABLE II

Worse Case Untaken Branches with Even Branch Alignment
(Single-Cycle Design)

| Cycle | IF | IS | PF1 | IREG | Description of Inst in RF Stage | RF | EX | DF |
|---|---|---|---|---|---|---|---|---|
| n | I0–I1 | — | — | — | — | — | — | — |
| n + 1 | I2–I3 | I0–I1 | — | — | — | — | — | — |
| n + 2 | I4–I5 | I2–I3 | — | I0–I1 | Branch to T1 | I0 | — | — |
| n + 3 | T0–T1 | I4–I5 | I2–I3 | I0–I1 | Delay Slot | I1 | I0 | — |
| n + 4 | I6–I7 | T0–T1 | I4–I5 | I2–I3 | Fall Through | I2 | I1 | I0 |
| n + 5 | I8–I9 | I6–I7 | I4–I5 | I2–I3* | Fall Through | I3 | I2 | I1 |
| n + 6 | I10–I11 | I8–I9 | I6–I7 | I4–I5 | Fall Through | I4 | I3 | I2 |

TABLE III

Worse Case Taken Branches with Odd Branch Alignment
(Single-Cycle Design)

| Cycle | IF | IS | PF1 | IREG | Description of Inst in RF Stage | RF | EX | DF |
|---|---|---|---|---|---|---|---|---|
| n | I0–I1 | — | — | — | — | — | — | — |
| n + 1 | I2–I3 | I0–I1 | — | — | — | — | — | — |
| n + 2 | I4–I5 | I2–I3 | — | I0–I1 | Branch to T1 | I1 | — | — |
| n + 3 | T0–T1 | I4–I5 | — | I2–I3 | Delay Slot | I2 | I1 | — |
| n + 4 | T2–T3 | T0–T1 | I4–I5 | I2–I3 | (Annulled) | (Annulled) | I2 | I1 |
| n + 5 | T4–T5 | T2–T3 | — | T0–T1* | Taken Stream Head | T1 | (Annulled) | I2 |
| n + 6 | T6–T7 | T4–T5 | — | T2–T3 | Taken Stream | T2 | T1 | (Annulled) |

TABLE IV

Worse Case Untaken Branches with Odd Branch Alignment
(Single-Cycle Design)

| Cycle | IF | IS | PF1 | IREG | Description of Inst in RF Stage | RF | EX | DF |
|---|---|---|---|---|---|---|---|---|
| n | I0–I1 | — | — | — | — | — | — | — |
| n + 1 | I2–I3 | I0–I1 | — | — | — | — | — | — |
| n + 2 | I4–I5 | I2–I3 | — | I0–I1 | Branch to T1 | I1 | — | — |
| n + 3 | T0–T1 | I4–I5 | — | I2–I3 | Delay Slot | I2 | I1 | — |
| n + 4 | I6–I7 | T0–T1 | I4–I5 | I2–I3 | Fall Through | I3 | I2 | I1 |
| n + 5 | I8–I9 | I6–I7 | — | I4*–I5 | Fall Through | I4 | I3 | I2 |
| n + 6 | I10–I11 | I8–I9 | I6–I7 | I4–I5 | Fall Through | I5 | I4 | I3 |

Figure 8:
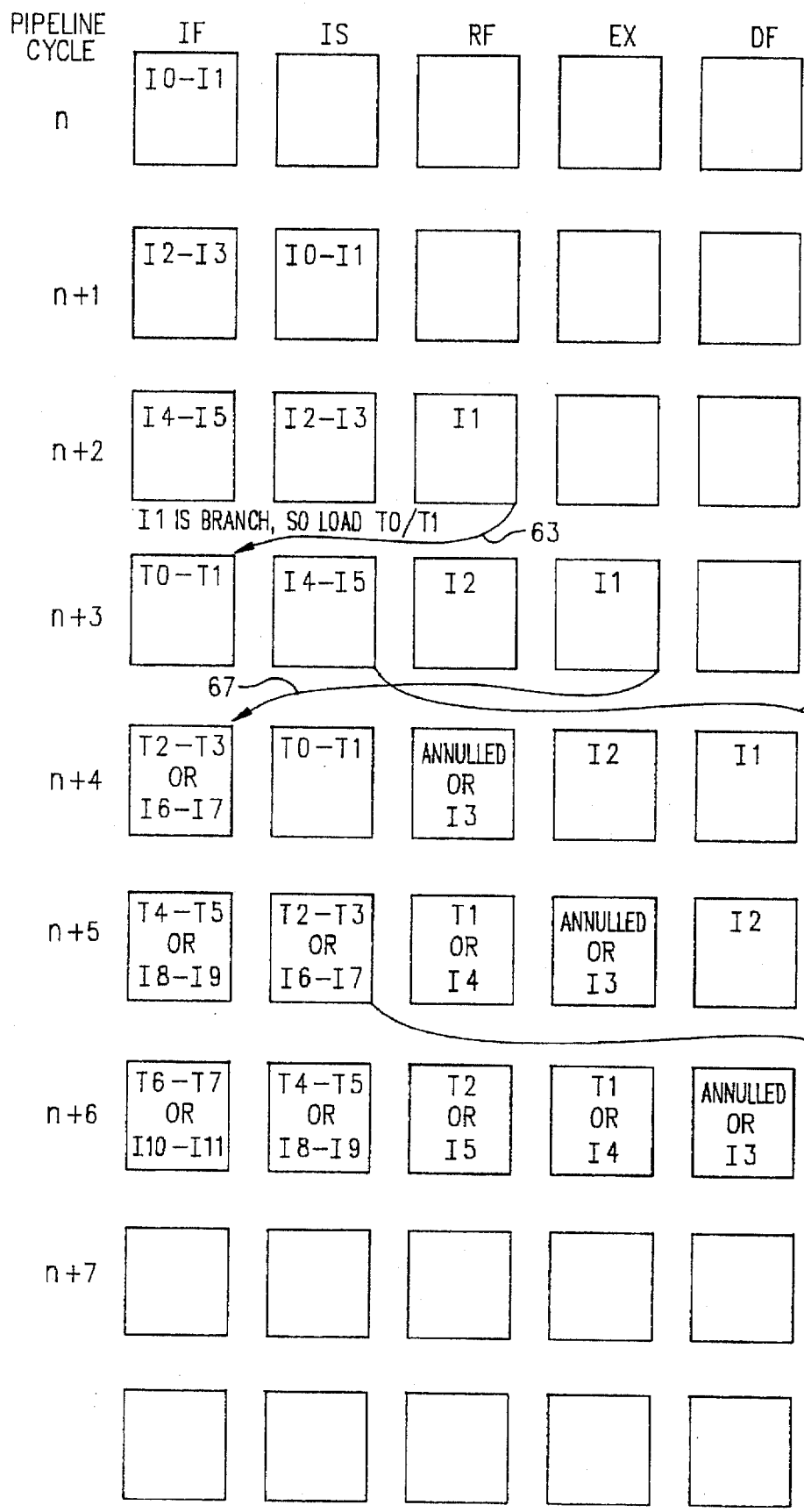
FIG. 8 is a schematic diagram similar to FIG. 5, but showing saving a pipeline cycle, according to one embodiment of the present invention.

As seen in Tables I–IV, according to this embodiment of the invention the target stream head instruction T1 is processed by the IF stage of the pipeline processing unit during the pipeline cycle when the branch instruction I0 is being processed by the execution stage. This situation is depicted in FIG. 8. As shown in FIG. 8, instructions I0 and I1 are processed by the first pipeline stage IF during pipeline cycle N. In this example, I0 is not necessarily an instruction which will be executed but is fetched since a double instruction word which is fetched must begin with an even addressed instruction.

In pipeline cycle N+1, instructions I0 and I1 are in the IS stage and the next double-word instruction I2–I3 is processed by the IF stage. In pipeline cycle N+2, instructions I0–I1 are passed to the RF stage, instructions I2–I3 are passed to the IS stage and the next double-word instruction I4–I5 is processed by the IF stage. Note that at this point the pipeline is two instructions ahead in the instruction stream in the sense that if single instructions were fetched, the pipeline would contain only instructions I1, I2 and I3 whereas in the configuration depicted in FIG. 8, two additional instructions (I4 and I5) are in the pipeline. In this embodiment, pipeline stage RF detects 63 that instruction I1 is a branch instruction and, using hardware to be described more fully below, begins calculation of the address of the head instruction of the taken branch, T1. This address is used in the next pipeline cycle N+3 to begin processing the instruction pair T0–T1 in the IF stage of the pipeline. In pipeline cycle N+3, both the head instruction of the fall-through stream I3 and the head instruction of the taken stream T1 are being processed in the pipeline.

In a normal pipeline, whatever instruction is in stage IS at cycle N+3 would be passed to stage RF at the next cycle (N+4). However, in the embodiment depicted in FIG. 8, double instruction word I4–I5 is instead placed 65 in the prefetch buffer PF1 for the N+4 pipeline cycle. The buffer PF1 is configured so that the instructions it contains can be made available to the first non-instruction-fetch stage (e.g. the Register fetch stage) directly, i.e. with no latency.

At the end of pipeline cycle N+3, the branch instruction I1 will have been executed by the EX stage and the information from the execution of the branch instruction can be used to determine 67 whether the double instruction word processed by stage IF in pipeline cycle N+4 should be T2–T3 (if the branch instruction I1 selects the taken stream) or I6–I7 (if the branch instruction I1 selects the fall-through stream). In pipeline cycle N+4, the delay slot instruction I2 is executed in the EX stage. In pipeline cycle N+5, no instruction is executed and instruction I3 is annulled. At pipeline cycle N+5 instruction pair T0–T1 is in the RF stage and instruction pair I4–I5 is in buffer PF1. The execution stage can receive an instruction from either the RF stage or from the PF1 buffer. Thus, at pipeline cycle N+6, the execution stage will receive instruction T1 if instruction I1 specified the taken stream and will receive instruction I4 if instruction I1 specified the fall-through stream. Comparing FIG. 8 with FIGS. 6 and 7, it can be seen that the embodiment of Tables I–IV and FIG. 8 results in reducing the number of wasted cycles from the two wasted cycles depicted in FIGS. 6 and 7 to a single wasted cycle as shown in FIG. 8.

In the embodiment shown in FIG. 8, obtaining a target instruction address requires the use of an adder. Previous devices have provided an adder (33, FIG. 1), typically a full word-sized adder, which is available for use in connection with an instruction when that instruction reaches the execution stage. FIG. 1 does not depict the detailed configuration or connection of the execution stage adder, since appropriate configurations for such an adder are well-known. In previous devices, branch instructions use this adder to generate a target address by adding the displacement field of the branch instruction to the contents of the program counter (PC). In order to permit initiation of calculating a target address during the RF stage, as described above, it is necessary to provide an adder which is available during the RF stage of processing of an instruction.

Figure 9:
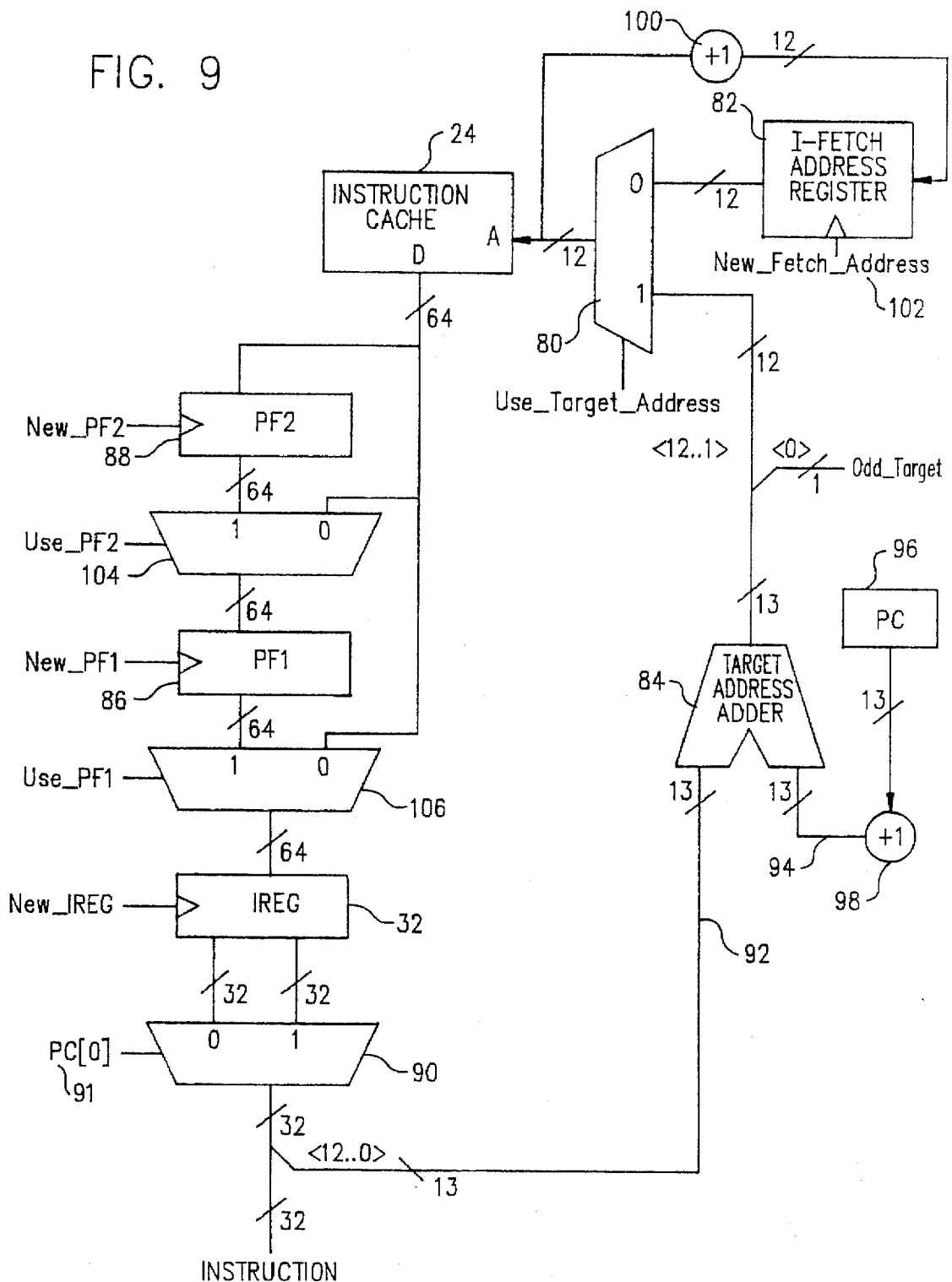
FIG. 9 is a block diagram of apparatus which can be used for pipeline processing of a branch instruction according to one embodiment of the present invention.

FIG. 9 shows a block diagram of the hardware which is used according to one embodiment of the invention. In the depicted embodiment, a multiplexer 80 selects the instruction cache address from one of the following two sources: (1) an I-fetch address register 82 which contains the address of the next sequential instruction that should be fetched in order to "get ahead" in the instruction stream; or (2) a target address adder 84 which generates branch target addresses during the RF stages of branch instructions. In one embodiment, the target address adder 84 is separate from and in addition to the execution stage adder, to permit calculation of the target addresses while the execution stage adder is otherwise occupied. Two prefetch registers (PF1 86 and PF2 88) are used to store prefetched instruction pairs and pass them along to IREG when needed. A multiplexer 90 selects the current instruction from the odd and even halves of the instruction pair in IREG.

The two inputs to the target address adder 84 are (1) a predetermined number of lower bits 92 of the displacement field from the current branch instruction, and (2) a predetermined number of lower bits 94 of the program counter 96 (PC). For this reason, in one embodiment, the target address adder is not a full word-width adder, but an adder having a predetermined bit width less than a full word. The predetermined number of bits is the number of bits needed to generate a cache index. In the depicted embodiment, this is 13 bits, but other numbers of bits could be used depending on factors such as the cache size. The PC value is shown as passing through an incrementer 98 to correct for the fact that the target address is being generated one cycle early. If the PC value of each pipe stage is available, this correction can be made without an incrementer 98 by selecting the PC of the RF stage rather than the EX stage.

The I-fetch address register 82 effectively temporally disconnects the instruction fetch from the rest of the pipeline. Its role in providing instruction cache addresses is similar to that of the PC in previous devices, except that it functions autonomously in this design and attempts to get ahead of the PC in the instruction stream. An incrementer 100 generates the new value for the I-fetch address register from the current instruction cache input address, as shown in FIG. 9. The new-fetch-address control signal 102 determines whether the value in the I-fetch address register should be updated. This decision is based on whether a branch is actually taken (in the case where a target instruction is fetched) or whether fetching further ahead in the instruction stream would exceed the capacity of the prefetch registers. Given that there are a finite number of prefetch registers, it is important not to fetch too far ahead.

While FIG. 9 shows two prefetch registers 88, 86 more or fewer prefetch registers can be provided. The greater the number of prefetch registers, the farther ahead it is possible to get in the sequential instruction stream. However, the benefits of getting ahead are limited by (1) the fact that basic blocks (i.e., non-branching code) tend to be small, and (2) the maximum rate at which the prefetch buffers can be consumed without being filled. In at least some embodiments, it is impossible to consume prefetch registers faster than they can be filled (in the absence of instruction cache misses). This means that there is little or no performance benefit in having more than one prefetch register. In other embodiments, including those described below, it is possible to consume prefetch registers faster than they can be filled, so it is preferable to have at least two prefetch registers. The value of having more than two prefetch registers is probably limited, however, since it would be difficult to get this far ahead in the instruction stream.

FIG. 9 shows multiplexers 104, 106 which select whether the input to PF1 and IREG comes directly from the instruction cache or from the previous prefetch register. PF2 does not need such a multiplexer since it is at the tail of the first-in-first-out (FIFO) prefetch buffer.

The control signals for the embodiment shown in FIG. 9 will be described below in connection with the signal equations provided in connection with FIG. 11. The signal equations for FIG. 9 are a subset of the signal equations for FIG. 11 as will be apparent to those skilled in the art.

Figure 6:
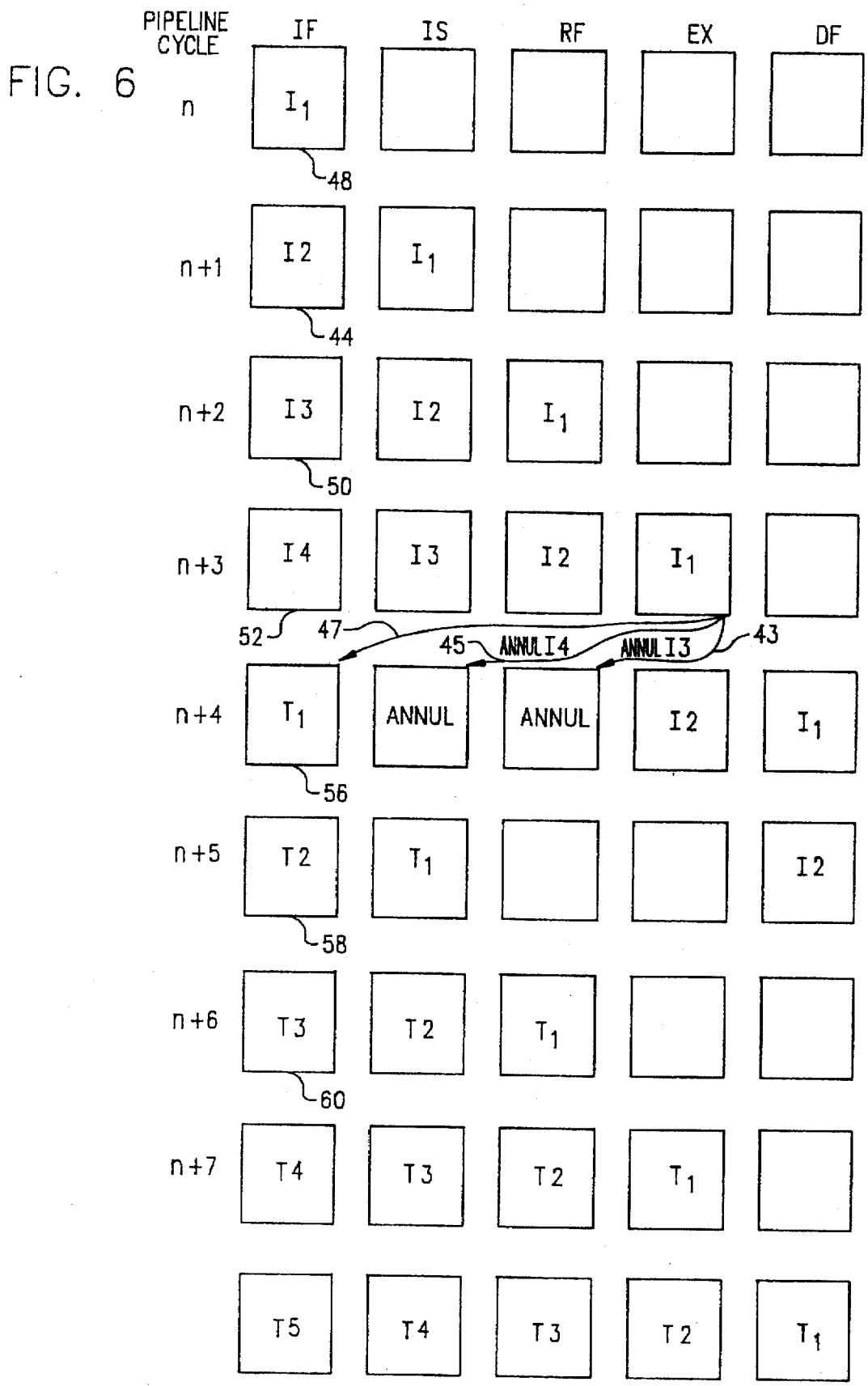
FIG. 6 is a schematic diagram similar to FIG. 5 but illustrating delay in the case of a taken branch.
Figure 7:
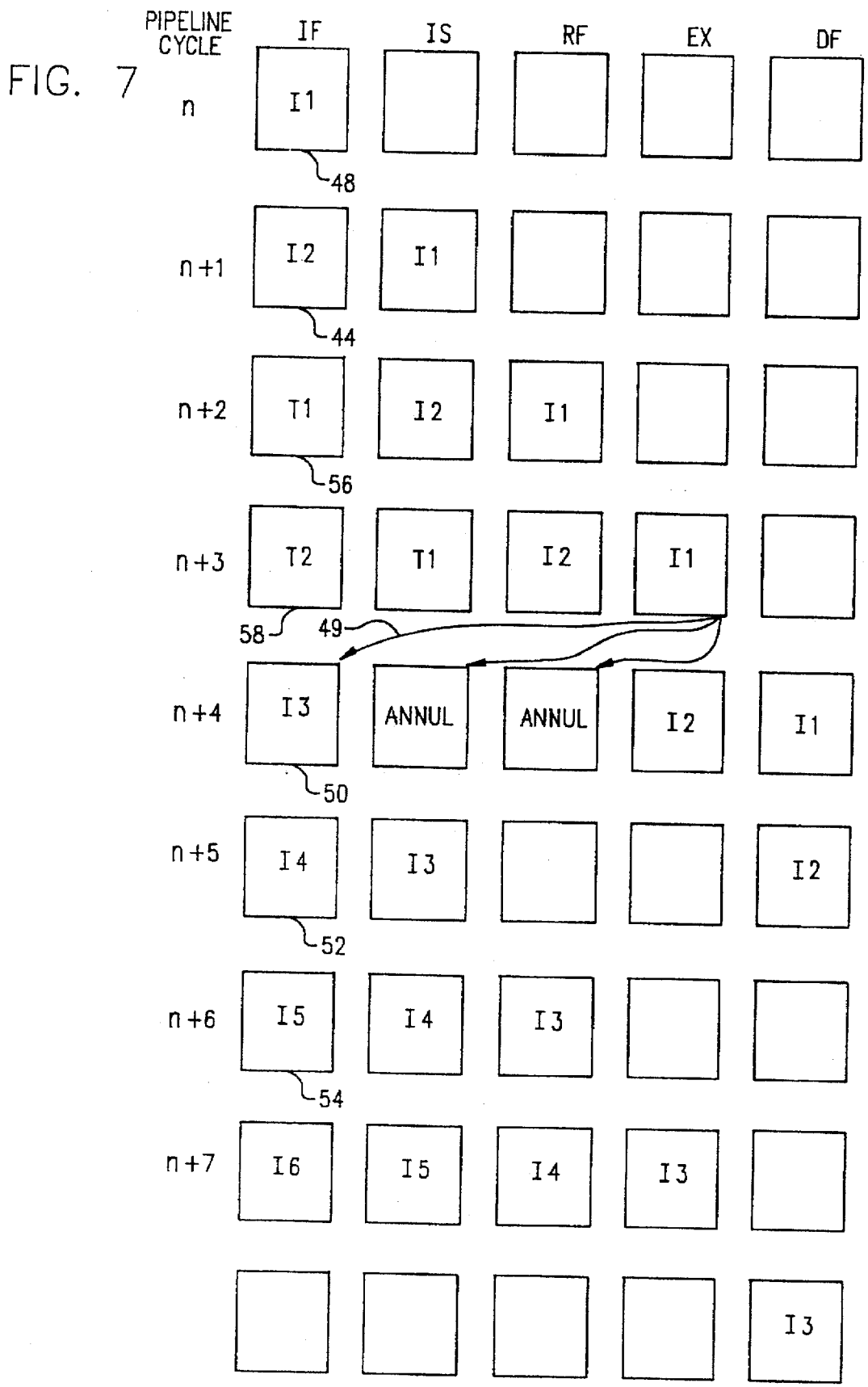
FIG. 7 is a schematic diagram similar to FIG. 5 but showing delay in the case of a not-taken branch.

Another embodiment of the invention provides the capability of at least sometimes eliminating both of the wasted cycles during taken branches which are illustrated in FIGS. 6 and 7.

In order to eliminate the second wasted cycle, the branch head address is generated two cycles early, rather than one cycle early. In the embodiment depicted in FIG. 8, the branch stream address generation was moved back from the EX to the RF stage of the branch instruction. In the alternative indications in FIG. 8, the upper entry corresponds to a "branch taken" situation, the lower entry corresponds to a "branch untaken" situation. Generating the branch stream head address two cycles early means that it must be generated before the RF pipeline stage of the branch instruction. This is not always possible, since in the apparatus of FIG. 1, an instruction is not guaranteed to be available (i.e. fetched from the instruction cache) until the start of its RF stage. It is only possible when the branch instruction is fetched early.

Figure 10:
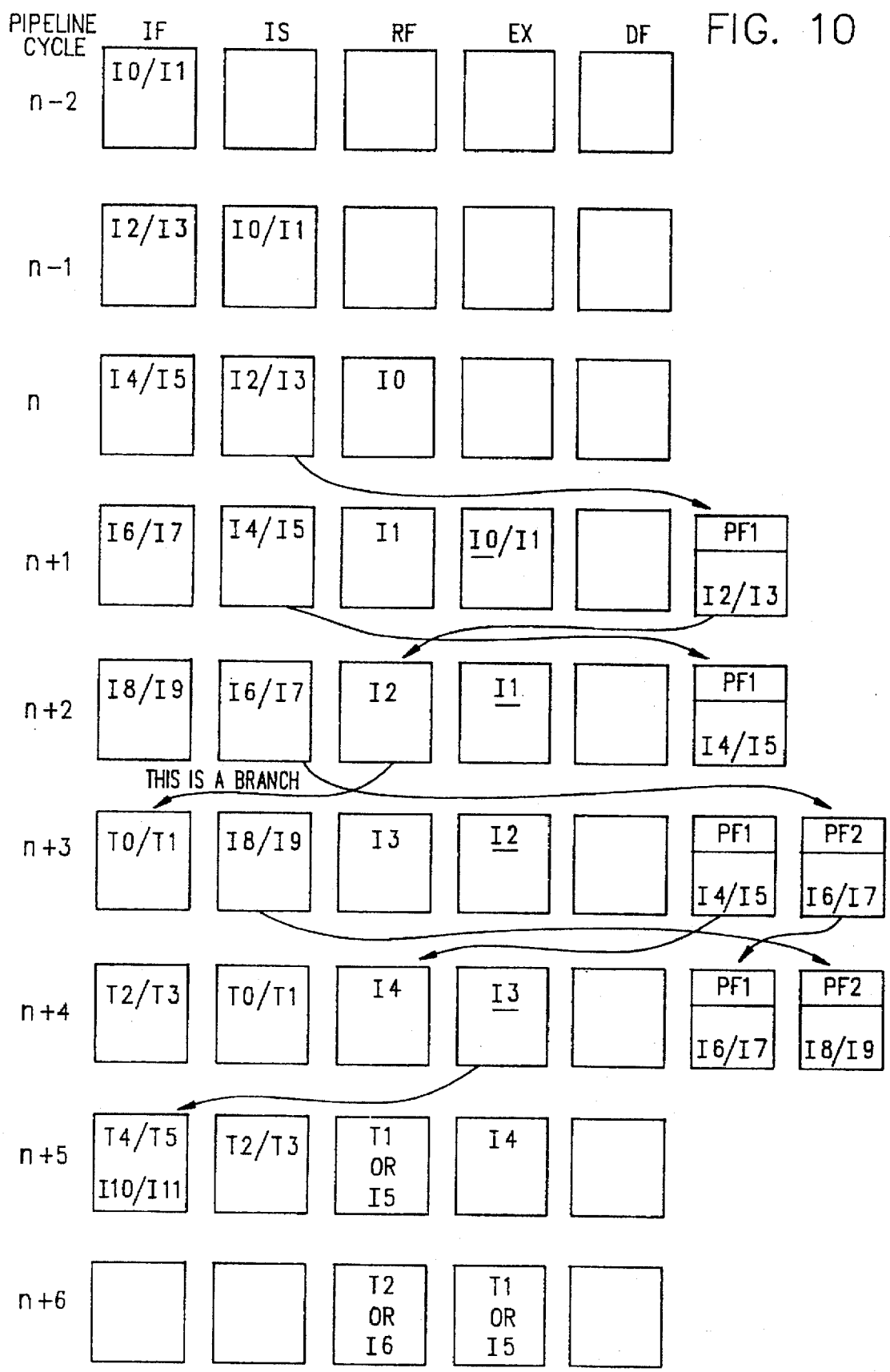
FIG. 10 is a schematic diagram similar to FIG. 5, but showing saving two pipeline cycles, according to one embodiment of the present invention.

FIG. 10 shows how a branch stream address can be generated two cycles early. In this figure, the branch instruction is instruction I3. As in the single-cycle design, an integer adder is available in the RF stage of each instruction for the purpose of generating branch stream addresses. Rather than using the adder during the RF stage of the branch instruction I3 (cycle N+3) it is used during the RF stage of the instruction before the branch (cycle N+2). Since, in this embodiment, the instruction before a branch is never a branch itself, the branch stream address adder should always be available. However, two conditions must be satisfied at the start of the RF stage of the instruction before the branch I2 in order to generate the target address two cycles early: (1) it must be certain that the instruction before the branch I2 is not a branch, and therefore does not need to use the branch stream address adder during its RF stage to generates its own branch stream address; and (2) the branch instruction I3 must already have been fetched from the instruction cache, since its branch displacement field is needed in order to generate the target address. The former condition can be met as long as the instruction before the branch exits the cache at least one cycle before it enters its RF stage; otherwise, the fact that it is not a branch would have to be determined instantaneously, (i.e., in less than one pipeline cycle), and this may not be possible. Whether the latter condition can be satisfied depends on whether the prefetcher manages to get ahead in the instruction stream at that time.

Saving both cycles on a branch depends on getting ahead in the instruction stream. When this is not possible, the procedure preferably reverts to saving only one of the cycles, using the embodiment depicted in FIG. 8. Rather than showing the worst-case examples (since only a single cycle can be saved in the worst case, as has already been discussed) Tables V through VIII provide examples of cases in which the prefetcher is far enough ahead in the instruction stream to save both cycles. Table V provides an example of a taken branch where the branch instruction falls in the odd half of a double-word. Table VI depicts an untaken branch where the branch instruction falls in the odd half of a double-word. Table VII depicts a taken branch where the branch instruction falls in the even half of a double-word and Table VIII depicts an untaken branch where the branch instruction falls in the even half of a double-word. In each table, odd branch stream head addresses are depicted since this case is worse than even branch stream head addresses. In the embodiments in Tables V–VIII, two prefetch registers (PF1 and PF2) rather than one prefetch register are used. These prefetch registers form a FIFO buffer, where PF1 is the head and PF2 is the tail. Preferably, the prefetch buffer is cleared on a taken branch.

TABLE V

Taken Branch with Odd Branch Alignment
(Two-Cycle Design)

| Cycle | IF | IS | PF2 | PF1 | IREG | Description of Inst in RF Stage | RF | EX | DF |
|---|---|---|---|---|---|---|---|---|---|
| n | I4–I5 | I2–I3 | — | — | — | — | — | — | — |
| n + 1 | I6–I7 | I4–I5 | — | I2–I3 | I0–<u>I1</u> | Before Branch | I1 | — | — |
| n + 2 | I8–I9 | I6–I7 | — | I4–I5 | I2–I3 | Before Branch | I2 | I1 | — |
| n + 3 | T0–T1 | I8–I9 | I6–I7 | I4–I5 | I2–<u>I3</u> | Branch to T1 | I3 | I2 | I1 |
| n + 4 | T2–T3 | T0–T1 | I8–I9 | I6–I7 | <u>I4</u>–I5 | Delay Slot | I4 | I3 | I2 |
| n + 5 | T4–T5 | T2–T3 | — | — | T0–<u>T1</u>* | Taken Stream Head | T1 | I4 | I3 |
| n + 6 | T6–T7 | T4–T5 | — | — | <u>T2</u>–T3 | Taken Stream | T2 | T1 | I4 |
| n + 7 | T8–T9 | T6–T7 | — | T4–T5 | T2–<u>T3</u> | Taken Stream | T3 | T2 | T1 |

TABLE VI

Untaken Branch with Odd Branch Alignment (Two-Cycle Design)

| Cycle | IF | IS | PF2 | PF1 | IREG | Description of Inst in RF Stage | RF | EX | DF |
|---|---|---|---|---|---|---|---|---|---|
| n | I4–I5 | I2–I3 | — | — | — | — | — | — | — |
| n + 1 | I6–I7 | I4–I5 | — | I2–I3 | I0–I1 | — | I1 | — | — |
| n + 2 | I8–I9 | I6–I7 | — | I4–I5 | I2–I3** | Before Branch | I2 | I1 | — |
| n + 3 | T0–T1 | I8–I9 | I6–I7 | I4–I5 | I2–I3 | Branch | I3 | I2 | I1 |
| n + 4 | T2–T3 | T0–T1 | I8–I9 | I6–I7 | I4–I5 | Delay Slot | I4 | I3 | I2 |
| n + 5 | I10–I11 | T2–T3 | I8–I9 | I6–I7 | I4–I5* | Fall Through | I5 | I4 | I3 |
| n + 6 | I12–I13 | I10–I11 | — | I8–I9 | I6–I7 | Fall Through | I6 | I5 | I4 |
| n + 7 | — | I12–I13 | — | I8–I9 | I6–I7 | Fall Through | I7 | I6 | I5 |

TABLE VII

Taken Branch with Even Branch Alignment (Two-Cycle Design)

| Cycle | IF | IS | PF2 | PF1 | IREG | Description of Inst in RF Stage | RF | EX | DF |
|---|---|---|---|---|---|---|---|---|---|
| n | I2–I3 | — | — | — | — | — | — | — | — |
| n + 1 | I4–I5 | I2–I3 | — | — | I0–I1 | — | I0 | — | — |
| n + 2 | I6–I7 | I4–I5 | — | I2–I3 | I0–I1 | Before Branch | I1 | I0 | — |
| n + 3 | T0–T1 | I6–I7 | — | I4–I5 | I2–I3 | Branch to T1 | I2 | I1 | I0 |
| n + 4 | T2–T3 | T0–T1 | I6–I7 | I4–I5 | I2–I3 | Delay Slot | I3 | I2 | I1 |
| n + 5 | T4–T5 | T2–T3 | — | — | T0–T1* | Taken Stream Head | T1 | I3 | I2 |
| n + 6 | T6–T7 | T4–T5 | — | — | T2–T3 | After Taken Stream | T2 | T1 | I3 |
| n + 7 | T8–T9 | T6–T7 | — | T4–T5 | T2–T3 | Taken Target Stream | T3 | T2 | T1 |

TABLE VIII

Untaken Branch with Even Branch Alignment (Two-Cycle Design)

| Cycle | IF | IS | PF2 | PF1 | IREG | Description of Inst in RF Stage | RF | EX | DF |
|---|---|---|---|---|---|---|---|---|---|
| n | I2–I3 | — | — | — | — | — | — | — | — |
| n + 1 | I4–I5 | I2–I3 | — | — | I0–I1 | — | I0 | — | — |
| n + 2 | I6–I7 | I4–I5 | — | I2–I3 | I0–I1 | Before Branch | I1 | I0 | — |
| n + 3 | T0–T1 | I6–I7 | — | I4–I5 | I2–I3 | Branch to TI | I2 | I1 | I0 |
| n + 4 | T2–T3 | T0–T1 | I6–I7 | I4–I5 | I2–I3 | Delay Slot | I3 | I2 | I1 |
| n + 5 | I8–I9 | T2–T3 | — | I6–I7 | *I4–I5 | Fall-Through | I4 | I3 | I2 |
| n + 6 | I10–I11 | I8–I9 | — | I6–I7 | I4–I5 | Fall-Through | I5 | I4 | I3 |
| n + 7 | I11–I12 | I10–I11 | — | I8–I9 | I6–I7 | Fall-Through | I6 | I5 | I4 |

Figure 11:
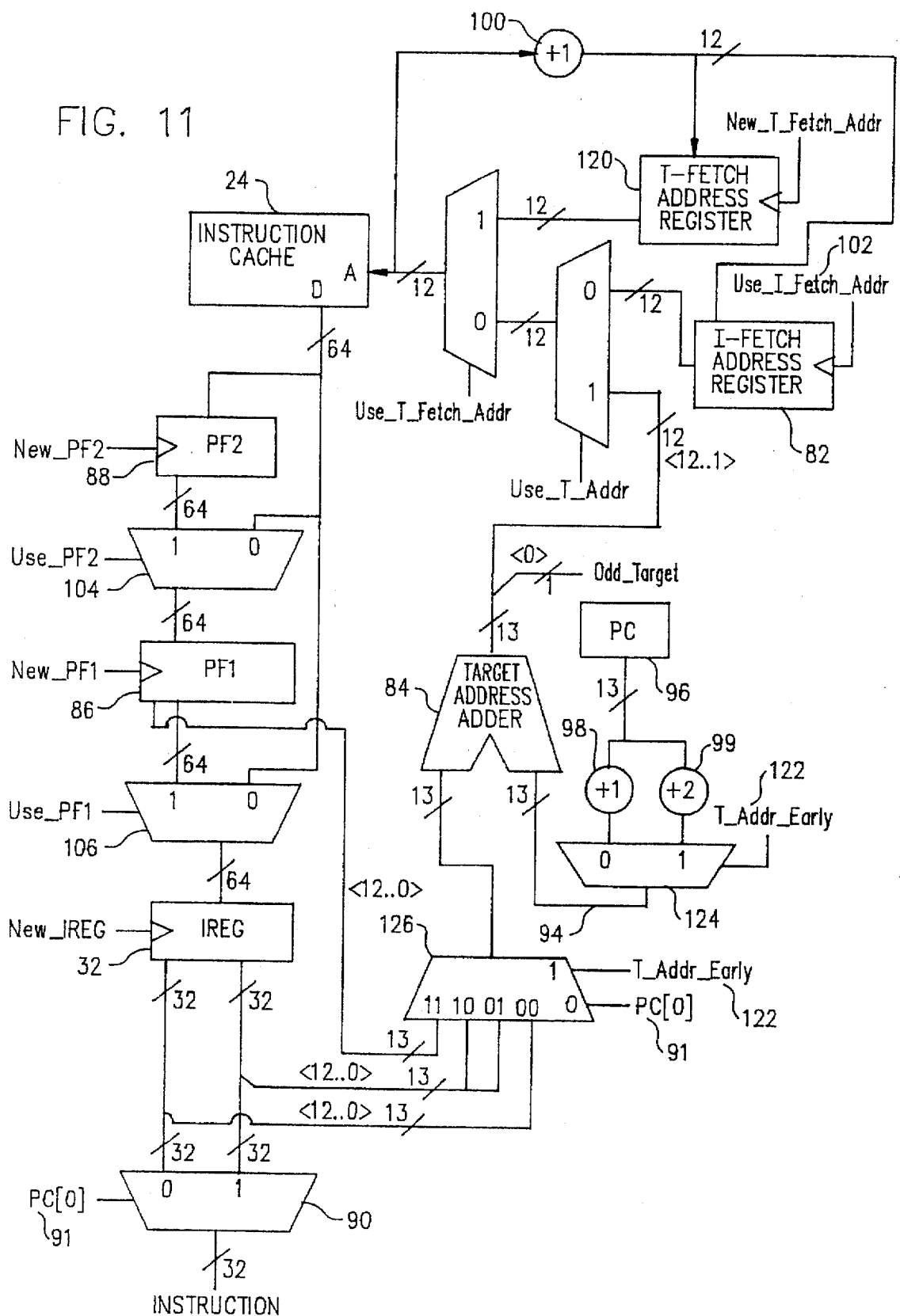
FIG. 11 is a block diagram of apparatus which can be used for pipeline processing of a branch instruction according to another embodiment of the present invention.

Tables XXI–XXIV provide signal definitions and signal equations according to the embodiment depicted in FIG. 11.

Table XXI defines pipeline signals which are latched, with one value associated with each pipe stage. As an instruction proceeds through the pipeline, its corresponding signal moves along with it. In the equations of Table XXIV, the signals of Table XXI are referenced as arrays, where the array index is a pipe stage name (e.g., RF, EX, etc.). This does not imply that the value of each signal is actually needed for every pipe stage.

TABLE XXI

Pipelined Signals

| | |
|---|---|
| not_a_branch | True if the prefetcher is able to determine that an instruction is not a branch instruction before it enters its RF pipe stage. |
| jump_reg | True if the instruction is a register-based jump instruction. The prefetcher must handle this case specially, since it changes the instruction stream path but cannot be handled as a branch. |
| was_a_branch | True if the instruction is a branch instruction. This can always be determined in the RF pipe stage. Note that this is not necessarily the negation of not_a_branch, since not_a_branch may be false for instructions that are not branches. |
| branch_taken | True if the instruction is a taken branch. This is determined at the end of the EX pipe stage (assuming that the instruction actually is a branch). |
| odd_inst | True if the instruction has an odd word address, and is therefore aligned in the odd half of its double-word instruction pair. |
| odd_target | True if the instruction is a branch and its target address is an odd word. This signal can be generated as the least significant bit of the branch target adder output. |

TABLE XXII

Single-Valued Latched Signals

| | |
|---|---|
| use_t_fetch_addr | True if the contents of the T-Fetch address should be used as the instruction cache address. This is a control signal for a multiplexer. |
| extra_t_fetch | True if an odd branch target is fetched two cycles early. This indicates that an extra instruction pair must be fetched from the target path. |
| new_t_fetch_addr | This control signal determines whether a new address should be latched into the T-Fetch Address Register. |
| use_t_addr | True if the output from the Target Address Adder should be used as the instruction cache address. This is a control signal for a multiplexer. |
| use_jr_addr | True if a jump-register address should be used as the instruction cache address. This should actually be a control signal. |
| t_addr_early | True if it is possible to compute a branch target address two cycles early. This control signal controls two multiplexers. |
| i_fetch_underway | True if a new instruction pair from the sequential stream is halfway through the instruction fetch process, i.e., is in its IS pipe stage. |
| t_fetch_underway | True if a branch target instruction pair is halfway through the instruction fetch process. |
| ireg_empty | True if IREG is empty, which means that the processor is currently stalled waiting for an instruction to arrive. |
| pf1_empty | True if PF1 is empty. |
| pf2_empty | True if PF2 is empty. |
| used_t_addr | True if use_t_addr was true during the previous cycle. |
| was_taken_branch | True during the first cycle after taken_branch[EX] is true. |
| was_a_branch_start | True during the first cycle after was_a_branch[RF] is true. |
| fetch_early | rue if it is safe to fetch a branch target instruction two cycles early. This takes into account whether enough fall-through instructions have already been fetched to prevent running out of instructions. The bias of the prefetch policy is reflected in this signal. |
| t_fetched_early | True if fetch_early was true during the previous cycle. |
| jump_reg_1st | True if jump_reg[EX] was true during the previous cycle. |
| jump_reg_2nd | True if jump_reg_1st was true during the previous cycle. |

TABLE XXIII

Single-Value Combinational Signals

| | |
|---|---|
| branch_arriving | True if a branch target instruction pair is currently exiting the instruction cache, i.e., has just completed its IS pipe stage. |
| i_fetch_completed | True if an instruction pair from the sequential stream is currently exiting the instruction cache. |
| new_ireg | This control signal is true whenever a new instruction pair should be latched into IREG. |
| use_pf1 | True if the contents of PF1 should be used as the input to IREG. |
| new_pf1 | True control signal is true whenever a new instruction pair should be latched into PF1. |
| use_pf2 | True if the contents of PF2 should be used as the input to PF1. |
| new_pf2 | This control signal is true whenever a new instruction pair should be latched into PF2. |
| new_i_fetch_addr | This control signal is true whenever a new address should be latched into the I-Fetch Address Register. |

TABLE XXIV

Signal Equations

```
jump_reg_1st[now]=jump_reg[DF]&~ireg_empty[then];
jump_reg_2nd[now]=jump_reg_1st[then];
branch_arriving=(used_t_addr[then]&branch_taken[DF])|jump_reg_2nd[then];
new_ireg=~odd_inst[RF]branch_arriving;
use_pf1=~pf1_empty[then]&~branch_arriving;
was_taken_branch[now]=branch_taken[DF]&~was_taken_branch[then];
i_fetch_completed=mux3(((jump_reg[DF]&~ ~ireg_empty[then])|
                   jump_reg_1st[then]),
              was_taken_branch,
              0,t_fetch_underway[then],i_fetch_underway[then]);
new_pf2=(~branch_arriving & i_fetch_completed &
        ((odd_inst[RF] &pf2_empty[then]& ~ pf1_empty[then])|
         (~odd_nst[RF] & pf2_empty[then])));
new_pf1 =(~branch_arriving &
        ((odd_nst[RF]& pf1_empty[then]&i_fetch_completed)|
         (~odd_inst[RF]&(pf2_empty[then]|(~pf1_empty[then]&
                    i_fetch_completed)))));
use_pf2=~pf2_empty[then];
pf2_empty[now]=mux4((branch_taken[DF]|jump_reg[DF]),
            (branch_arriving|
              (~odd_inst[RF]&~i_fetch_completed)),
            new_pf2,
            1,1,0,pf2_empty);
pf1_empty[now]=mux4((branch_taken[DF]|jump_reg[DF]),
            (branch_arriving|
              (~odd_inst[RF]&~i_fetch_completed &
               pf2 empty[then])),
            new_pf1,
            1,1,0,pf1_empty);
extra_t_fetch[now]=fetch_early[then] & odd_target[EX];
t_fetch_underway[now]=extra_t_fetch[then];
new_i_fetch_addr=(was_taken_branch[then]|
          (was_taken_branch[now]&use_t_addr[then])|
          jump_reg[DF]|
          (~use_t_addr[then]& ~extra_t_fetch[then]&
          ~(~odd_inst[RF]& ~pf2_empty[then] & i_fetch_underway)));
i_fetch_underway[now]=(new_i_fetch_addr &
            ((~use_t_fetch_addr[then] & ~use_t_addr[then]&
              ~use_ir_addr[then])|
             (use_t_fetch_addr[then]& branch_taken[DS])));
t_addr_early[now]=not_a_branch[RF]&~(odd_inst[RF]& pf1_empty[now]);
```

Table XXII provides definitions of single-valued latched signals. In the equations of Table XXII, the single-valued latched signals are referenced as arrays that have two values: "now" which represents the current input to the latch and "then" which represents the output of the latch since the last time it was set.

Table XXIII defines single-valued combinational signals. These signals are not latched, but are simple combinatorial logic signals. They are referenced in Table XXIII as scaler variables (i.e., they are not indexed to arrays). Some of these signals are internal nodes within other equations, and are defined for the sake of making the logic equations more readable.

Table XXIV includes the logic equations for all of the signals. Several of these equations include multiplexers with two, three or four inputs. These instances of multiplexers are shown as procedure calls which have the following definitions (expressed in C-language notation).

```
mux2    (sel1, I1, I2) = sel1 ? I1 : I2;
mux3    (sel1, sel2, I1, I2, I3) = sel1 ? I1 : (sel2 ? I2:I3);
mux4    (sel1, sel2, sel3, I1, I2, I3, I4) = sel1 ? I1 : (sel2 ?
        I2 : (sel3 ? I3 : I4)).
```

The clock signal which triggers all of the latches in these equations (i.e., causes "now" to become "then") is different from the normal latch clock in certain previous devices. Unlike certain previous devices, which have a latch clock that stops whenever the processor stalls, the clock for the prefetching latches is rarely stopped. This is because prefetching can continue even though the processor may be stalled (e.g., when it is waiting for a data cache miss to complete). The manner of providing software and hardware to carry out the equation of Tables XXI–XXIV will be apparent to those skilled in the art upon review of the tables.

A critical pipe stage in Tables V–VIII is the RF stage of the second instruction after the branch. At this point, depending on whether the fall-through or non-fall-through stream is selected, either the branch stream head instruction (T1) or the fall-through stream head instruction (I5 for odd branch alignment, I4 for even alignment) must be in IREG. Those two instances are indicated in the tables by a single asterisk. As in the case of the single-cycle design, for taken branches the target instruction arrives straight out of the instruction cache, while for untaken branches the fall-through is fetched early and stored in a prefetch register.

Another critical pipe stage is the RF stage of the instruction before the branch, which is when target address generation occurs. At this point, the instruction before the branch must be in IREG, and the branch itself must be in either the upper half of IREG (in the case of odd branch alignment) or the lower half of PF1 (in the case of even branch alignment). Those two instructions are indicated in the tables by a double asterisk.

As noted above, one condition for being able to generate a branch stream address two cycles early is that it must be ascertained that the instruction before the branch is not a branch itself when it enters its RF pipe stage. In at least some pipeline processors it is possible to determine that a given instruction is not a branch only if at least one cycle is available to inspect it between its exit from the instruction cache and entering its RF stage. In the examples shown in Tables V through VIII, this condition is satisfied. In Table V and VI, the instruction before the branch (I2) spends one cycle waiting in PF1 before it moves to IREG. In Tables VII and VIII the instruction before the branch (I1) spends one cycle waiting in IREG (while I0 is in the RF stage) before it is executed.

In contrast, Table IX shows the case where there is no time to inspect the instruction before the branch (I2) before it enters its RF stage. This table can be compared directly with Table V. In Table IX, the branch instruction (I3) is available in the upper half of IREG when the instruction before the branch (I2) enters its RF stage. Therefore, the target address can be computed two cycles early if it is possible to instantaneously determine that I2 is not a branch. If such instantaneous determination is not possible, only a single cycle can be saved, as shown in Table IX.

TABLE IX

Taken Branch With Odd Branch Alignment -
Only a Single Cycle Saved (Two-Cycle Design)

| Cycle | IF | IS | PF1 | IREG | Description of Inst in RF Stage | RF | EX | DF |
|---|---|---|---|---|---|---|---|---|
| n     | I2–I3 | —     | — | —       | —                  | —          | —          | —         |
| n + 1 | I4–I5 | I2–I3 | — | —       | —                  | —          | —          | —         |
| n + 2 | I6–I7 | I4–I5 | — | I2–I3   | Before Branch      | I2         | —          | —         |
| n + 3 | I8–I9 | I6–I7 | — | I2–I3   | Branch to TI       | I3         | I2         | —         |
| n + 4 | T0–T1 | I8–I9 | I6–I7 | I4–I5 | Delay Slot         | I4         | I3         | I2        |
| n + 5 | T2–T3 | T0–T1 | — | I4–I5   | Annulled           | (Annulled) | I4         | I3        |
| n + 6 | T4–T5 | T2–T3 | — | T0–T1*  | Taken Stream Head  | T1         | (Annulled) | I4        |
| n + 7 | T6–T7 | T4–T5 | — | T2–T3   | Taken Stream       | T2         | T1         | (Annulled)|

Additional techniques can be used to overcome this problem in at least some cases. One technique would be to take advantage of the fact that branches can never occur back-to-back. For example, if the instruction preceding I2 in Table IX (i.e., instruction I1) is a branch, then it is certain that I2 is not a branch. This would be helpful in a case where a branch and its delay slot are followed immediately by another branch.

Another technique would be to inspect a small number of bits (perhaps only a single bit) in the instruction operation code (OP code) to quickly distinguish a subset of instructions that are not branches. Such an inspection would occur at the start of the RF pipe stage, and would have to be fast enough to be considered "instantaneous." In some cases it may be possible to inspect one or more bits to identify some, but not all, non-branch instructions (which can be used to provide improved, if not optimum, performance.) The complexity of such a partial inspection is limited by the number of gates that can be added while still meeting the clock cycle time. In general, a single bit in the OP code can be examined without requiring additional gates (other than those needed by buffering).

As noted above, a second condition for generating a branch target address two cycles early is the availability of the branch instruction. Table X shows a case where the branch instruction (I2) is still in the second instruction fetch stage (IS) when the instruction before the branch (I1) is in its RF pipe stage. Even if it is known that I1 is not a branch and therefore the target address adder is available during its RF stage, it is not possible to generate the target address of I2 at that time since its branch displacement field cannot be read. Therefore, the target address cannot be generated until the RF stage I2, saving only a single cycle as shown in Table X.

and (2) prevent a stall from occurring if the branch specifies the fall-through stream. Therefore, in the embodiment described above, the instruction fetch policy must be biased toward one branch outcome or the other. The decision as to which way to bias is influenced by the probability of a branch specifying a taken stream and by the hardware complexity of each of the approaches. Biasing in favor of fall-through streams can be achieved by suppressing the decision to fetch two cycles early (rather than one cycle early) whenever the hazardous condition is detected. To bias in favor of taken streams, the target stream is always fetched as early as possible, but the processor must be prepared for

TABLE X

Only a single cycle can be saved. If the branch instruction (I2) is not available when the instruction before the branch (I1) enters its RF pipe stage.

| Cycle | IF | IS | PF1 | IREG | Description of Inst in RF Stage | RF | EX | DF |
|---|---|---|---|---|---|---|---|---|
| n | I0–I1 | — | — | — | — | — | — | — |
| n + 1 | I2–I3 | I0–I1 | — | — | — | — | — | — |
| n + 2 | I4–I5 | I2–I3 | — | I0–I1 | Before Branch | I0 | — | — |
| n + 3 | I6–I7 | I4–I5 | — | I2–I3 | Branch to T1 | I2 | I0 | — |
| n + 4 | T0–T1 | I6–I7 | I4–I5 | I2–I3 | Delay Slot | I3 | I2 | I0 |
| n + 5 | T2–T3 | T0–T1 | I6–I7 | I4–I5 | Annulled | (Annulled) | I3 | I2 |
| n + 6 | T4–T5 | T2–T3 | — | T0–T1* | Taken Stream Head | T1 | (Annulled) | I3 |
| n + 7 | T6–T7 | T4–T5 | — | T2–T3 | Taken Stream | T2 | T1 | (Annulled) |

One consideration in connection with the present invention is the rate at which branches can consume instruction fetch bandwidth. By the time the branch outcome is determined (at the end of the EX stage of the branch instruction), the fetch of both the target instruction (T1) and the instruction following it (T2) must already be underway, in addition to the fetch of the corresponding fall-through instructions. For the embodiment depicted in FIG. 8, each branch required fetching only a single instruction (the target instruction itself) in addition to the fall-through instructions. The significance of this is that while it is always possible to fetch a single extra instruction for every branch, it is not always possible to fetch two extra instructions while fetching the fall-through instructions at the same time. In at least one embodiment, since branch instructions can occur as frequently as one every other instruction, and since fetching the fall-through path would require half of those cycles, that only leaves one cycle per branch for fetching target stream instructions. If the target stream head and the instruction following it fall within the same double-word instruction pair (i.e., the target stream head is an even instruction), it is possible to fetch them both in a single cycle. However, for odd-address target stream head instructions, the target stream head and the instruction following it will fall within different instruction pairs and cannot be fetched in a single cycle.

Thus, if the prefetcher has not been able to get far enough ahead in the instruction stream when it reaches a branch with an odd target stream head, it is not possible to (1) save both of the wasted cycles if the branch specifies the taken stream gaps in the fall-through instruction stream. This latter approach may complicate the pipeline hardware significantly, since instructions may be missing in unpredictable places. In contrast, biasing in favor of the fall-through stream should not complicate the pipeline hardware since, typically, the processor already has interlocks to deal with the delayed execution of target stream instructions.

To illustrate the tradeoffs of biasing the instruction fetch policy, examples are provided with taken streams and fall-through streams both when biasing in favor of fall-through streams of (Tables XI and XII) and when biasing in favor of taken streams (Tables XIII and XIV). The hazard in this example is that when the branch stream head address is generated two cycles early (i.e., during the RF stage of I2), the prefetcher has fetched the first fall-through stream instruction (I5), shown in the IF stage at that time, but not the second fall-through stream instruction (I6). If the bias is toward fall-through streams, then the fetch of the target stream head (T1) is delayed so that the second fall-through stream instruction (I6) can be fetched in time to prevent a stall if the branch specifies falls through. Therefore, only a single cycle is saved if the branch specifies the taken stream (Table XI), but a stall does not occur if the branch specifies fall-through (Table XII). In contrast, if the bias is toward taken streams, the stream head target (T1) is fetched two cycles early so that both cycles are saved if the branch specifies the taken stream (Table XIII), but a stall will occur if the branch specifies falls through when the second fall-through instruction (I6) attempts to execute.

TABLE XI

Bias Toward Fall Through, Branch Taken

| Cycle | IF | IS | PF1 | IREG | Description of Inst in RF Stage | RF | EX | DF |
|---|---|---|---|---|---|---|---|---|
| n | Ta–Tb | I2–I3 | — | — | — | — | — | — |
| n + 1 | Tc–Td | Ta–Tb | I2–I3 | I0–I1 | — | — | — | — |
| n + 2 | I4–I5 | Tc–Td | — | I2–I3* | Before Branch | I2 | — | — |
| n + 3 | I6–I7 | I4–I5 | — | I2–I3 | Branch to TI | I3 | I2 | — |
| n + 4 | T0–T1 | I6–I7 | — | I4–I5 | Delay Slot | I4 | I3 | I2 |
| n + 5 | T2–T3 | T0–T1 | I6–I7 | I4–I5 | (Annulled) | (Annulled) | I4 | I3 |
| n + 6 | T4–T5 | T2–T3 | — | T0–T1* | Taken Stream Head | T1 | (Annulled) | I4 |
| n + 7 | T6–T7 | T4–T5 | — | T2–T3 | Taken Stream | T2 | T1 | (Annulled) |

TABLE XII

Bias Toward Fall-through - Branch Untaken

| Cycle | IF | IS | PF1 | IREG | Description of Inst in RF Stage | RF | EX | DF |
|---|---|---|---|---|---|---|---|---|
| n | Ta–Tb | I2–I3 | — | — | — | — | — | — |
| n + 1 | Tc–Td | Ta–Tb | I2–I3 | I0–I1 | — | — | — | — |
| n + 2 | I4–I5 | Tc–Td | — | I2–I3** | Before Branch | I2 | — | — |
| n + 3 | I6–I7 | I4–I5 | — | I2–I3 | Branch to T1 | I3 | I2 | — |
| n + 4 | T0–T1 | I6–I7 | — | I4–I5 | Delay Slot | I4 | I3 | I2 |
| n + 5 | I8–I9 | T0–T1 | I6–I7 | I4–I5 | Fall-Through | I5 | I4 | I3 |
| n + 6 | I10–I11 | I8–I9 | — | *I6–I7 | Fall-Through | I6 | I5 | I4 |
| n + 7 | I12–I13 | I10–I11 | I8–I9 | I6–I7 | Fall-Through | I7 | I6 | I5 |

TABLE XIII

Bias Toward Branch - Branch Taken

| Cycle | IF | IS | PF1 | IREG | Description of Inst in RF Stage | RF | EX | DF |
|---|---|---|---|---|---|---|---|---|
| n | Ta–Tb | I2–I3 | — | — | — | — | — | — |
| n + 1 | Tc–Td | Ta–Tb | I2–I3 | — | — | I1 | — | — |
| n + 2 | I4–I5 | Tc–Td | — | I2–I3** | Before Branch | I2 | I1 | — |
| n + 3 | T0–T1 | I4–I5 | — | I2–I3 | Branch to T1 | I3 | I2 | I1 |
| n + 4 | T2–T3 | T0–T1 | — | I4–I5 | Delay Slot | I4 | I3 | I2 |
| n + 5 | T4–T5 | T2–T3 | — | T0–T1 | Taken Stream Head | T1 | I4 | I3 |
| n + 6 | T6–T7 | T4–T5 | — | *T2–T3 | Taken Stream | T2 | T1 | I4 |
| n + 7 | T8–T9 | T6–T7 | T4–T5 | T2–T3 | Taken Stream | T3 | T2 | T1 |

TABLE XIV

Bias Toward Branch, Branch Untaken

| Cycle | IF | IS | PF1 | IREG | Description of Instruction in RF Stage | RF | EX | DF |
|---|---|---|---|---|---|---|---|---|
| n | Ta–Tb | I2–I3 | — | — | — | — | — | — |
| n + 1 | Tc–Td | Ta–Tb | I2–I3 | I0–I1 | — | I1 | — | — |
| n + 2 | I4–I5 | Tc–Td | — | I2–I3** | Before Branch | I2 | I1 | — |
| n + 3 | T0–T1 | I4–I5 | — | I2–I3 | Branch to T1 | I3 | I2 | I1 |
| n + 4 | T2–T3 | T0–T1 | — | I4–I5 | Delay Slot | I4 | I3 | I2 |
| n + 5 | I6–I7 | T2–T3 | — | I4–I5 | Fall-Through | I5 | I4 | I3 |
| n + 6 | I8–I9 | I6–I7 | — | — | (Stall) | — | I5 | I4 |
| n + 7 | I10–I11 | I8–I9 | — | *I6–I7 | Fall-Through | I6 | — | I5 |

TABLE XV

Bias Toward Fall-Through - Branch Taken
First and Second Fall-Throughs (I4 & I5) Not Fetched Early

| Cycle | IF | IS | PF2 | PF1 | IREG | Description of Inst in RF Stage | RF | EX | DF |
|---|---|---|---|---|---|---|---|---|---|
| n     | I2–I3  | —     | — | —     | —       | —                | —           | —           | —           |
| n + 1 | Ta–Tb  | I2–I3 | — | —     | I0–I1   | —                | I0          | —           | —           |
| n + 2 | Tc–Td  | Ta–Tb | — | I2–I3 | I0–I1   | Before Branch    | I1          | I0          | —           |
| n + 3 | I4–I5  | Tc–Td | — | —     | I2–I3   | Branch to T1     | I2          | I1          | I0          |
| n + 4 | T0–T1  | I4–I5 | — | —     | I2–I3   | Delay Slot       | I3          | I2          | I1          |
| n + 5 | T2–T3  | T0–T1 | — | —     | —       | Annulled         | (Annulled)  | I3          | I2          |
| n + 6 | T4–T5  | T2–T3 | — | —     | T0–T1*  | Taken Stream Head| T1          | (Annulled)  | I3          |
| n + 7 | T6–T7  | T4–T5 | — | —     | T2–T3   | Taken Stream     | T2          | T1          | (Annulled)  |

TABLE XVI

Bias Toward Branch, Branch Untaken
First and Second Fall-Through (I4–I5) Not Fetched Early

| Cycle | IF | IS | PF1 | PF2 | IREG | Description of Inst in RF Stage | RF | EX | DF |
|---|---|---|---|---|---|---|---|---|---|
| n     | I2–I3  | —     | —      | — | —        | —              | —  | —  | —  |
| n + 1 | Ta–Tb  | I2–I3 | —      | — | I0–I1    | —              | I0 | —  | —  |
| n + 2 | Tc–Td  | Ta–Tb | I2–I3| — | I0–I1  | Before Branch  | I1 | I0 | —  |
| n + 3 | T0–T1  | Tc–Td | —      | — | I2–I3    | Branch to T1   | I2 | I1 | I0 |
| n + 4 | T2–T3  | T0–T1 | —      | — | I2–I3    | Delay Slot     | I3 | I2 | I1 |
| n + 5 | I4–I5  | T2–T3 | —      | — | —        | (Stall)        | —  | I3 | I2 |
| n + 6 | I6–I7  | I4–I5 | —      | — | —        | (Stall)        | —  | —  | I3 |
| n + 7 | I8–I9  | I6–I7 | —      | — | *I4–I5   | (Fall-Through) | I4 | —  | —  |

An even more hazardous scenario is presented in Tables XV and XVI. In this case, neither of the fall-through instructions (I4 and I5) has been fetched by the time the target stream head address can be generated two cycles early. Those tables show only the two cases where cycles are lost (i.e., when the branch outcome is in the opposite direction of the bias), since the other two cases are similar to Tables XII and XIII. If the bias is in favor of fall-through streams, as shown in Table XV, then the fetch of the target stream head instruction (T1) is delayed so that the fall-through instructions (I4 and I5) can be fetched, resulting in only a single cycle being saved if the branch specifies the taken stream but no stalls if the branch specifies fall-through. Fortunately, whenever this situation arises, it will always be the case that the two fall-through instructions fall within the same double-word, and therefore can be fetched in a single cycle as shown in Table XV.

On the other hand, if the bias is in favor of taken streams, both the target stream head instruction (T1) and the instruction immediately following it (T2) will be fetched early. If the branch specifies the taken stream, both cycles will be saved. However, if the branch specifies fall-through, as shown in Table XVI, the fetch of the first fall-through instruction (I4) will be delayed to the point where two stall cycles will occur. Thus, biasing in favor of taken streams can result in the loss of up to two cycles, while biasing in favor of fall-through streams will never cost more than a single cycle.

FIG. 11 shows a block diagram of the hardware which can be used in connection with the embodiment of FIG. 10 and Tables V through VIII. Several differences can be seen between FIG. 11 and FIG. 9. The top of each figure shows the mechanism which feeds addresses to the instruction cache. In both cases, the source of this address can be either the I-Fetch Address Register 82 (in order to fetch ahead in the sequential instruction stream) or the Target Address Adder 84 (for fetching branch targets). In addition, FIG. 11 shows a third source of instruction addresses: the T-Fetch Address Register 120. The need for this register arises since it is possible to fetch two instruction pairs from the target path before the branch outcome is determined. This situation occurs whenever the target head is fetched two cycles early and the target is an odd instruction. For example, in Table V through Table VIII, both T0–T1 and T2–T3 are fetched before the branch outcome is determined. While the Target Address Adder 84 provides the address of the instruction pair that includes the target head (T0–T1), it will not generate the address of the instruction pair following the target (T2–T3). This second address (T2–T3) can be generated by incrementing the original target address (T0–T1). After it is generated, this second target address (T2–T3) must be stored somewhere during the cycle when it provides the input address for the instruction cache. If the prefetcher already had information indicating that the branch would specify the taken (rather than untaken) stream, it could simply store the second target address (T2–T3) in the I-Fetch Address Register, since the instruction stream would follow the target path. However, since the branch outcome is not known at this point, the contents of the I-Fetch Address Register must be preserved in case the branch specifies fall-through. Therefore, the T-Fetch Address Register 120 is provided to hold the second target stream address when odd targets are fetched two cycles early. Once the branch outcome is determined, the contents of the T-Fetch Address Register 120 will either be discarded (if the branch specifies falls through) or incremented and stored in the I-Fetch Address Register as the new sequential instruction stream (if the branch specifies the taken stream).

The two inputs to the Target Address Adder 84 are a branch displacement field and a PC value. However, as shown in FIG. 11, the hardware to provide these inputs is complicated by the ability to generate target addresses two cycles early as well as one cycle early. In order to distinguish these cases, a new control signal is introduced: T_Addr_Early 122. This signal is true (=1) whenever a target is generated two cycles early, and false (=0) when a target is generated only one cycle early. The T_Addr_Early signal 122 controls a multiplexer 124 that selects whether the PC value should be incremented by one or by two in order to correct for early target address generation. As discussed above, this correction can be made without incrementers if the PC value of each pipe stage is available. If so, the correction amounts to selecting the PC from either the IS or RF stage rather than the EX stage.

The four-to-one multiplexer 126 selects the proper branch displacement field as input to the Target Address Adder 84. The multiplexer 126 is controlled by how early the target address is being generated (T_Addr_Early 122) and by whether the current instruction is odd or even (PC[0]91). If the target address is only being generated one cycle early (i.e. T_Addr_Early=0), then the branch displacement field is taken from the current instruction. This is always the case with the single-cycle design, as shown in FIG. 9. However, when the target address is generated two cycles early (i.e., T_Addr_Early=1), the branch displacement field is taken from the instruction following the current instruction. This means that if the current instruction is in the lower half of IREG 32 (i.e., it is an even instruction), the branch displacement field is taken from the instruction in the upper half of IREG 32. Similarly, if the current instruction is in the upper half of IREG 32 (i.e. it is odd), the displacement field is taken from the instruction in the lower half of the first prefetch register, PF1 86. This latter case is only legal if PF1 is not empty. This does not create a special problem, however, since T_Addr_Early 122 will already take this into account.

In contrast with the single-cycle design, where only a single prefetch register is probably sufficient, it is strongly preferred to have at least two prefetch registers with the apparatus of FIG. 11. This is because it is possible to consume an arbitrary number of prefetched instructions without fetching any new ones. The reason for this is that branches can occur as frequently as once every other instruction (due to delay slots), and fetching an odd target stream instruction two cycles early requires two fetch cycles. This leaves no cycles for fetching fall-through instructions. The ability to fetch targets stream instructions two cycles early is limited by how far ahead the prefetcher is in the instruction stream. There are two causes for the prefetcher not being far enough ahead in the instruction stream (in the absence of cache misses): (1) there have not been enough fetch cycles since the last time the prefetch buffer was flushed (e.g., since the last jump or taken branch), or (2) the prefetcher had sufficient time, but at some point could not fetch further ahead without overflowing the prefetch buffer. While the former cases are unavoidable, the latter cases can be reduced through deeper prefetch buffers. However, it is expected that the marginal value of each additional prefetch register decreases, since the small size of basic blocks limits how far ahead the prefetcher can get in the instruction stream.

In another embodiment of the present invention, an instruction cache is configured that permits simultaneous fetching of two independent instructions. In this embodiment, the pipeline contains two first instruction fetch stages IF1 and IF2 and two second instruction fetch stages IS1 and IS2. Tables XVII and XVIII illustrate operation of this embodiment for the case of a taken branch with odd branch alignment and an untaken branch with odd branch alignment. Tables XIX and XX illustrate this embodiment in the case of a taken branch with even branch alignment and an untaken branch with even branch alignment, respectively. In each of these cases, the fall-through instruction I3 and the target instruction T1 are fetched in parallel.

TABLE XVII

Simultaneous Fetching - Taken Branch, Odd Alignment

| Cycle | IF1 | IF2 | IS1 | IS2 | IREG | Description of Inst in RF Stage | RF | EX | DF |
| --- | --- | --- | --- | --- | --- | --- | --- | --- | --- |
| n | I0 | — | — | — | — | — | — | — | — |
| n + 1 | I1 | — | I0 | — | — | — | — | — | — |
| n + 2 | I2 | — | I1 | — | I0 | Branch to T1 | I0 | — | — |
| n + 3 | I3 | T1 | I2 | — | I1 | Delay Slot | I1 | I0 | — |
| n + 4 | T2 | — | I3 | T1 | I2 | (Annulled) | (Annulled) | I1 | I0 |
| n + 5 | T3 | — | T2 | — | T1 | Taken Stream Head | T1 | (Annulled) | I1 |
| n + 6 | T4 | — | T3 | — | T2 | Taken Stream | T2 | T1 | (Annulled) |

TABLE XVIII

Simultaneous Fetching Untaken Branch, Odd Alignment

| Cycle | IF1 | IF2 | IS1 | IS2 | IREG | Description of Inst in RF Stage | RF | EX | DF |
|---|---|---|---|---|---|---|---|---|---|
| n     | I0 | —  | —  | —  | —  | —            | —  | —  | —  |
| n + 1 | I1 | —  | I0 | —  | —  | —            | —  | —  | —  |
| n + 2 | I2 | —  | I1 | —  | I0 | Branch to T1 | I0 | —  | —  |
| n + 3 | I3 | T1 | I2 | —  | I1 | Delay Slot   | I1 | I0 | —  |
| n + 4 | I4 | —  | I3 | T1 | I2 | Fall Through | I2 | I1 | I0 |
| n + 5 | I5 | —  | I4 | —  | I3* | Fall Through | I3 | I2 | I1 |
| n + 6 | I6 | —  | I5 | —  | I4 | Fall Through | I4 | I3 | I2 |

TABLE XIX

Simultaneous Fetch - Taken Branch, Even Alignment

| Cycle | IF1 | IF2 | IS1 | IS2 | IREG | Description of Inst in RF Stage | RF | EX | DF |
|---|---|---|---|---|---|---|---|---|---|
| n     | I1 | —  | —  | —  | —  | —                | —          | —          | —          |
| n + 1 | I2 | —  | I1 | —  | —  | —                | —          | —          | —          |
| n + 2 | I3 | —  | I2 | —  | I1 | Branch to T1     | I1         | —          | —          |
| n + 3 | I4 | T1 | I3 | —  | I2 | Delay Slot       | I2         | I1         | —          |
| n + 4 | T2 | —  | I4 | T1 | I3 | (Annulled)       | (Annulled) | I2         | I1         |
| n + 5 | T3 | —  | T2 | —  | T1 | Taken Stream Head | T1        | (Annulled) | I2         |
| n + 6 | T4 | —  | T3 | —  | T2 | Taken Stream     | T2         | T1         | (Annulled) |

TABLE XX

Simultaneous Fetch Untaken Branch, Even Alignment

| Cycle | IF1 | IF2 | IS1 | IS2 | IREG | Description of Inst in RF Stage | RF | EX | DF |
|---|---|---|---|---|---|---|---|---|---|
| n     | I1 | —  | —  | —  | —  | —            | —  | —  | —  |
| n + 1 | I2 | —  | I1 | —  | —  | —            | —  | —  | —  |
| n + 2 | I3 | —  | I2 | —  | I1 | Branch to TI | I1 | —  | —  |
| n + 3 | I4 | T1 | I3 | —  | I2 | Delay Slot   | I2 | I1 | —  |
| n + 4 | I5 | —  | I4 | T1 | I3 | Fall Through | I3 | I2 | I1 |
| n + 5 | I6 | —  | I5 | —  | I4* | Fall Through | I4 | I3 | I2 |
| n + 6 | I7 | —  | I6 | —  | I5 | Fall Through | I5 | I4 | I3 |

Figure 12:
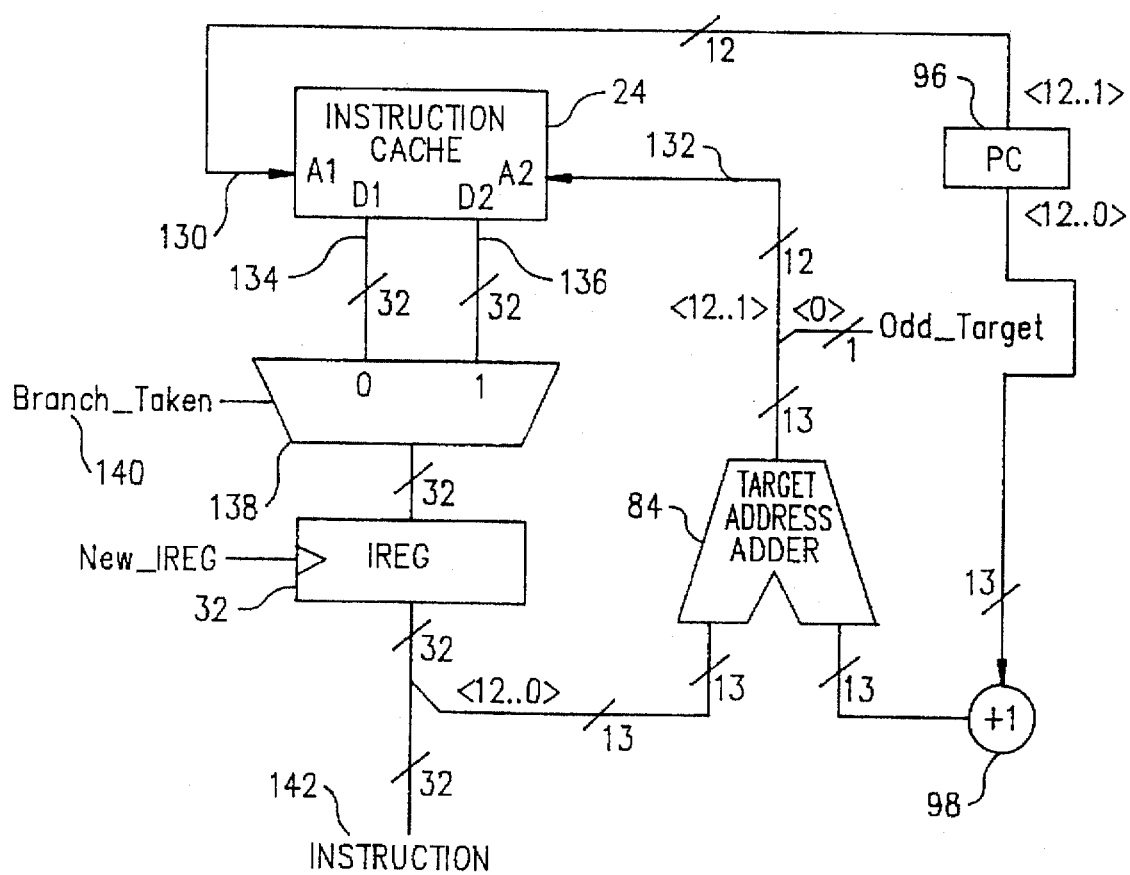
FIG. 12 is a block diagram of an apparatus which can be used for pipeline processing of a branch instruction according to one embodiment of the present invention.

FIG. 12 depicts hardware that can be used in connection with this embodiment of the invention. In the embodiment illustrated in FIG. 12, the instruction cache has two address input 130, 132 and two data outputs 134, 136. The first address input 130 receives an address from the program counter 96 and the second address input 132 receives an address from a target address adder 84. The address from the target address adder is the sum of an address from the program counter 96 after it has been incremented by an incrementer 98 and the contents of the IREG register 32. A multiplexer 138 controlled by the branch outcome 140 selects which of the two instructions 142 would be allowed to proceed through the pipe. The other instruction would be discarded. Because the embodiment of FIG. 12 requires provision of the specialized instruction cache and provision of two first instruction fetch stages and two second instruction fetch stages, it is believed likely that the hardware cost involved in the embodiment of FIG. 12 will be higher than the hardware cost for the other embodiments described herein.

In light of the above description, a number of advantages of the present invention can be seen. The present invention provides for pipeline processing of branch instructions while reducing the number of delays following execution of the branch instruction and increasing throughput and efficiency of the pipeline processor. The invention always permits saving at least a single cycle on taken branches, compared to previous devices and the method and can sometimes save two cycles on taken branches. The present invention avoids excessive redesign and excessive additional hardware since it takes advantage of some design and hardware already found in certain pipeline processors, such as the ability to fetch two instructions during each pipeline cycle.

A number of variations and modifications of the present invention can also be used. The present invention can be used in connection with pipeline processors in addition to those described, and in particular can be used with pipeline processors having more or fewer pipeline stages. The present invention can be used in connection with a computer which does not store instructions in a instruction cache, such as computers which store instruction in the main memory. The present invention could be used in connection with instructions which have more than two branch targets or could be used in connection with instructions where there are two target streams but neither branch is a fall-through stream. The present invention can be used in connection with a pipeline processor that provides more or fewer delay slot instructions in the delay slots following a branch instruction. The present invention can be used with devices for obtaining two instructions at a time other than the double wide fetch discussed such as by providing multiple fetch cycles during a single pipeline cycle. The present invention can be used in combination with other techniques such as in combination with branch prediction techniques. It is possible to use some aspects of the invention without using other aspects. For example, it is possible to use the invention as depicted in FIG. 9 without using the invention as depicted in FIG. 11 or it is possible to use the invention as depicted in Tables V–VIII without using the invention as depicted in Tables I–IV. The concept of fetching ahead in the instruction stream can be used to save more than two cycles.

According to one aspect, the invention includes a method for processing instructions in a computer with a pipeline processing system having a plurality of stages, including at least an execution stage and a previous stage, the instructions including at least one branch instruction which, when processed in the execution stage, causes execution of the following instruction to be execution of a first stream head instruction or a first stream head instruction, the first stream head instruction being the first instruction in a first stream of instructions, the second stream head instruction being the first instruction in the second stream of instructions, the first stream head instruction being different from the second stream head instruction, wherein the addresses of the first stream head instruction and the second stream head instruction are available for instruction fetching when the branch instruction has been processed by the previous stage, with the method including a first step of beginning the fetching of said first stream head instruction after the branch instruction is processed by the previous stage and before completion of processing by the branch instruction by the execution stage and a second step including beginning the fetching of the second stream head instruction after the branch instruction is processed by the previous stage and before completion of processing of the branch instruction by the execution stage. According to an aspect of the invention, the method described above further includes providing an instruction register and providing a prefetch register different from the instruction register, storing the first stream head instruction in the prefetch register, loading the instruction register with the contents of the prefetch register when the branch instruction is an instruction which, upon execution by the execution stage causes execution of a following instruction to be execution of the first stream head instruction and loading the instruction register with at least the second stream head instruction when the branch instruction is an instruction which, upon execution by the instruction stage, causes execution of a following instruction to be execution of the second stream head instruction.

Although the invention has been described by way of a preferred embodiment and certain variations and modifications, other variations and modifications can also be used, the invention being defined by the following claims.

What is claimed is:

1. A method for processing instructions in a computer with a pipeline processing system having a plurality of stages for processing instructions, said pipeline processing system including an execution stage and at least one previous stage, wherein processing of an instruction by said pipeline processing system includes operating said pipeline processing system in a plurality of pipeline cycles, in which each of said plurality of stages of said pipeline can process a different instruction during one of said pipeline cycles, and wherein processing of an instruction by said pipeline processing system includes fetching said instruction during one of said pipeline cycles and executing said instruction, in said execution stage in a later pipeline cycle, and wherein there is at least a first number of pipeline cycles between initiation of said fetching of said instruction during said one of said pipeline cycles, and initiation of said executing of said instruction in said execution stage, said instructions including at least one branch instruction which, when processed in said execution stage, causes branching to a first instruction stream or a second instruction stream, said branching to said first instruction stream comprising execution of a first instruction stream head instruction, said branching to said second instruction stream comprising execution of a second instruction steam head instruction, the method comprising the steps of:

for each and every said branch instruction, beginning fetching of said first instruction stream head instruction with said pipeline processing system before completion of processing of said branch instruction by said execution stage wherein, when said execution of said branch instruction causes branching to said first instruction stream, the number of pipeline cycles between completion of said processing of said branch instruction by said execution stage and initiation of processing of said first instruction stream head instruction is less than said first number of cycles; and for each and every said branch instruction, beginning fetching of said second instruction stream head instruction with said pipeline processing system before completion of processing of said branch instruction by said execution stage, wherein, when said execution of said branch instruction causes branching to said second instruction stream, the number of pipeline cycles between completion of said processing of said branch instruction by said execution stage and initiation of processing of said second instruction stream head instruction is less than said first number of cycles.

2. A method, as claimed in claim 1, further comprising completing fetching of said first instruction stream head instruction and said second instruction stream head instruction by said pipeline processing system before completion of processing of said branch instruction by said execution stage.

3. A method, as claimed in claim 1, wherein the number of pipeline cycles between completion of said processing of said branch instruction by said execution stage and initiation of processing of said first instruction stream by said pipeline processing system is at least two less than said first number of cycles, and the number of pipeline cycles between completion of said processing of said branch instruction by said execution stage and initiation of processing of said second instruction stream by said pipeline processing system is at least two less than said first number of cycles.

4. A method, as claimed in claim 1, wherein said first number of pipeline cycles is equal to the number of pipeline stages which an instruction passes through between initiation of said fetching of said instruction and initiation of execution of said instruction in said execution stage.

5. A pipeline processor for executing instructions in a computer comprising:

a program counter having a program counter value stored therein;

a plurality of pipeline stages, including at least an execution stage and an instruction fetch stage, said execution stage including at least a first adder for use in connection with execution stage processing;

a target address calculation unit including at least
an instruction register for holding a displacement value indicating a relative address of a first instruction stream head instruction specified by each branch instruction among said instructions, and
a second adder coupled to said instruction register, said program counter, and said instruction fetch stage, said second adder being different from said first adder, said second adder for receiving said displacement value from said instruction register and a numerical value based on said program counter value and outputting a first address for said first instruction stream head instruction;

wherein said instruction fetch stage begins fetching said first instruction stream head instruction and a second instruction stream head instruction before processing of each said branch instruction by said execution stage is completed for every said branch instruction.

6. A pipeline processor, as claimed in claim 5, further comprising means for selecting said numerical value from a first value and a second value based upon said program counter value, said means for selecting said numerical value being coupled to said instruction fetch stage.

7. A pipelined processor, as claimed in claim 6, wherein said first value is said program counter value incremented by one.

8. A pipelined processor, as claimed in claim 7, wherein said second value is said program counter value incremented by two.

9. A pipeline processor, as claimed in claim 5, wherein said first adder has a first width and said second adder has a second width, said second width being less than said first width.

10. A pipeline processor, as claimed in claim 5, further comprising a first prefetch register coupled to said instruction register for holding at least a first prefetch instruction and loading said first prefetch instruction into said instruction register.

11. A pipeline processor, as claimed in claim 10, further comprising a second prefetch register coupled to said first prefetch register for holding at least a second prefetch instruction and loading said second prefetch instruction into said first prefetch register.

12. A pipeline processor, as claimed in claim 10, wherein said instruction register stores at least first and second instructions.

13. A pipeline processor, as claimed in claim 12, further comprising means for selecting whether an input to said second adder will be taken from said first instruction, said second instruction or said first prefetch instruction, said selecting means being coupled to said instruction register and said second adder.

14. A pipeline processor, as claimed in claim 5, further comprising
an instruction cache coupled to said instruction register for receiving an address and outputting an instruction to at least said instruction register, and
an instruction fetch address register coupled to said instruction cache for receiving a control signal and, in response, storing an incremented value of an address input to said instruction cache.

15. A pipeline processor, as claimed in claim 14, further comprising, a target fetch address register coupled to said instruction cache for receiving a control signal and, in response, storing an incremented value of an address input to said instruction cache.

16. Apparatus for use in executing instructions in a computer, said computer having a program counter with a program counter value stored therein, said computer also having an instruction pipeline having a plurality of pipeline stages, including at least an execution stage and an instruction fetch stage, said execution stage including at least a first adder for use in connection with execution stage processing, the apparatus comprising:
a target address calculation unit including at least:
means for holding a displacement value indicating a relative address of a first instruction steam head instruction specified by each branch instruction among said instructions; and
adder means coupled to said holding means and to said instruction fetch stage, said adder means being different from said first adder, said adder means for receiving said displacement value from said holding means and a numerical value based on said program counter value and outputting a first address for said first instruction steam head instruction;
wherein said instruction fetch stage begins fetching said first instruction stream head instruction and a second instruction stream head instruction before processing of each said branch instruction by said execution stage is completed for every said branch instruction.

17. Apparatus, as claimed in claim 16, wherein said computer includes:
N pipeline stages between said instruction fetch stage and said execution stage, including at least a pre-execution stage, said instructions including at least one branch instruction which, when processed in said execution stage, causes branching to one of a first instruction stream and a second instruction streams, each instruction stream having a head instruction, and wherein:
said instruction fetch stage includes:
a first prefetch register;
first means for fetching said branch instruction;
second means for fetching said first instruction stream head instruction;
third means for fetching said second instruction stream head instruction;
first means for storing at least said first instruction stream head instruction in said first prefetch register, said storing means being coupled to said first prefetch register and said means for fetching said branch instruction, said means for fetching said first instruction stream head instruction, and said means for fetching said second instruction stream head instruction;
said execution stage includes:
means for executing said branch instruction after initiation of said steps of fetching said first instruction stream head instruction and fetching said second instruction stream head instruction;
and wherein said apparatus further comprises:
first means for loading said pre-execution stage with one of said first and second instruction stream head instructions, said first loading means being coupled to said first storing means, said pre-execution stage being loaded with said second instruction stream head instruction when execution of said branch instruction causes branching to said second instruction stream and said pre-execution stage being loaded with said first instruction stream head instruction when execution of said branch instruction causes branching to said first instruction stream; and
second means for loading one of said instruction stream head instructions in said pre-execution stage into said execution stage and executing said instruction stream head instruction so loaded, said second loading means being coupled to said pre-execution stage and said execution stage.

18. Apparatus, as claimed in claim 17, wherein:
said instruction fetch stage further includes:
a second prefetch register, and
third means for loading at least a second instruction from said first instruction stream into said second prefetch register, said third means being coupled to said second prefetch register; and
said execution stage further includes:
means for executing at least said second instruction at a pipeline cycle following execution of said first instruction stream head instruction.

19. Apparatus, as claimed in claim 18, further comprising:

first means for transferring at least said second instruction from said second prefetch register to said prefetch register, said first means for transferring being coupled to said first and second prefetch registers;

second means for transferring said second instruction from said first prefetch register to said pre-execution stage, said second means for transferring being coupled to said first prefetch register and said pre-execution stage; and third means for transferring said second instruction from said pre-execution stage to said execution stage, said third means for transferring being coupled to said pre-execution stage and said execution stage.

20. A pipelined processor, as claimed in claim 16, further comprising means, coupled to said adder means, for selecting said numerical value from a first value and a second value based upon said program counter value, wherein said first value is said program counter value incremented by one and said second value is said program counter value incremented by two.

* * * * *

UNITED STATES PATENT AND TRADEMARK OFFICE
CERTIFICATE OF CORRECTION

PATENT NO. : 5,696,958

DATED : December 9, 1997

INVENTOR(S) : Todd C. Mowry and Earl A. Killian

It is certified that error appears in the above-indentified patent and that said Letters Patent is hereby corrected as shown below:

On the title page, item 56 add the following:

4,833,599  5/1989  Colewell et al...........395/650
5,481,685  1/1996  Nguyen et al............395/375
4,858,105  8/1989  Kuriyama et al.........395/375
5,287,467  2/1994  Blaner et al.............395/375
5,327,547  7/1994  Stiles et al..............395/425
5,434,985  7/1995  Emma et al............395/375
5,442,756  8/1995  Grochowski et al.......395/375
5,390,355  2/1995  Horst....................395/800
5,381,531  1/1995  Hanawa et al...........395/375

Signed and Sealed this

Nineteenth Day of October, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,696,958

DATED : December 9, 1997

INVENTOR(S) : Todd C. Mowry and Earl A. Killian

It is certified that error appears in the above-indentified patent and that said Letters Patent is hereby corrected as shown below:

Claim 1, at page 33, line 66 after instruction, please delete [steam] and insert stream Signed and Sealed this Twenty-third Day of November, 1999

Attest:

Q. TODD DICKINSON

*Attesting Officer*  *Acting Commissioner of Patents and Trademarks*